US012171724B2

(12) United States Patent
Imran et al.

(10) Patent No.: US 12,171,724 B2
(45) Date of Patent: Dec. 24, 2024

(54) METHOD AND APPARATUS FOR MANUFACTURING MICROTABLETS

(71) Applicant: InCube Labs, LLC, San Jose, CA (US)

(72) Inventors: Mir A. Imran, Los Altos Hills, CA (US); Arthur Hsu Chen Chang, San Jose, CA (US); Chang Jin Ong, Fremont, CA (US); Delia Anna Gratta, San Jose, CA (US)

(73) Assignee: InCube Labs, LLC, San Jose, CA (US)

(*) Notice: Subject to any disclaimer, the term of this patent is extended or adjusted under 35 U.S.C. 154(b) by 0 days.

(21) Appl. No.: 18/365,419

(22) Filed: Aug. 4, 2023

(65) Prior Publication Data

US 2023/0372201 A1 Nov. 23, 2023

Related U.S. Application Data

(63) Continuation of application No. 16/704,822, filed on Dec. 5, 2019, now Pat. No. 11,779,522.

(60) Provisional application No. 62/776,826, filed on Dec. 7, 2018.

(51) Int. Cl.

| | |
|---|---|
| ***B30B 11/00*** | (2006.01) |
| ***A61J 3/10*** | (2006.01) |
| ***B30B 15/02*** | (2006.01) |

(52) U.S. Cl.
CPC ............... *A61J 3/10* (2013.01); *B30B 15/022* (2013.01); *B30B 11/00* (2013.01)

(58) Field of Classification Search
CPC .......... A61J 3/10; B30B 11/00; B30B 15/022; B30B 7/04; B30B 9/3021; B30B 9/3035; B30B 9/3078; B30B 9/327
See application file for complete search history.

(56) References Cited

U.S. PATENT DOCUMENTS

| | | | | |
|---|---|---|---|---|
| 4,557,190 A | | 12/1985 | Vezzani | |
| 4,880,373 A | * | 11/1989 | Balog | B29C 43/04 425/149 |
| 5,203,261 A | | 4/1993 | Davis | |
| 6,036,974 A | | 3/2000 | Tsushima et al. | |
| 7,247,013 B2 | | 7/2007 | Roland | |

(Continued)

FOREIGN PATENT DOCUMENTS

| | | |
|---|---|---|
| CN | 104994827 A | 10/2015 |
| JP | 318076 Y2 | 4/1991 |

(Continued)

OTHER PUBLICATIONS

Japanese Office Action with English translation for Application No. 2021-531857, dated Mar. 14, 2024, 5 pages.

(Continued)

*Primary Examiner* — Thu Khanh T. Nguyen
(74) *Attorney, Agent, or Firm* — Brooks Kushman P.C.

(57) ABSTRACT

Embodiments provide methods and apparatus for manufacturing a microtablet from a precursor material such as a pharmaceutical powder. Various embodiments provide a method which includes compressing the powder to form a compressed mass of a selected density and repeatedly compacting the compressed mass to increase the density of the compressed mass and form a microtablet. Related methods and apparatus are provided.

26 Claims, 23 Drawing Sheets

(56) References Cited

U.S. PATENT DOCUMENTS

| | | | |
|---|---|---|---|
| 8,192,659 B1 | 6/2012 | Coppeta et al. | |
| 9,078,807 B2 * | 7/2015 | Narasaki | B30B 15/065 |
| 9,610,225 B2 | 4/2017 | Maeda et al. | |
| 9,757,514 B2 | 9/2017 | Imran et al. | |
| 2005/0084560 A1 | 4/2005 | Roland | |
| 2008/0131543 A1 | 6/2008 | Teckoe et al. | |
| 2009/0130243 A1 | 5/2009 | Inoue et al. | |
| 2013/0274659 A1 | 10/2013 | Imran et al. | |
| 2014/0084507 A1 | 3/2014 | Young et al. | |
| 2014/0352557 A1 | 12/2014 | Linton | |
| 2015/0328150 A1 | 11/2015 | Maeda et al. | |
| 2015/0374586 A1 * | 12/2015 | Gamlen | B30B 11/14 425/150 |
| 2016/0101584 A1 | 4/2016 | Yang | |
| 2018/0304569 A1 * | 10/2018 | Gamlen | B30B 15/32 |

FOREIGN PATENT DOCUMENTS

| | | |
|---|---|---|
| JP | H09122995 A | 5/1997 |
| JP | 2007506499 A | 3/2007 |
| JP | 2007307592 A | 11/2007 |

OTHER PUBLICATIONS

Korean Office Action with English translation for Application No. 10-2021-7018148, dated Mar. 18, 2024, 6 pages.

Extended European Search Report for Application No. 19893864.9, dated Aug. 3, 2022, 7 pages.

Chinese Office Action with English translation for Application No. 201980080899.3, dated Aug. 1, 2022, 16 pages.

International Search Report and Written Opinion for Application No. PCT/US19/64932, dated Feb. 25, 2022, 7 pages.

Chinese Office Action with English translation for Application No. 201980080899.3, dated Jan. 5, 2023, 14 pages.

Indian Examination Report for Application No. 202147030194, dated Jan. 9, 2023, 6 pages.

Japanese Office Action with English translation for Application No. 2021-531857, dated Jun. 30, 2023, 9 pages.

Japan Decision of Rejection with English translation for Application No. 2021-531857, dated Jun. 19, 2024, 4 pages.

* cited by examiner

METHOD AND APPARATUS FOR MANUFACTURING MICROTABLETS

CROSS-REFERENCE TO RELATED APPLICATIONS

This application is a continuation of U.S. application Ser. No. 16/704,822 filed Dec. 5, 2019 which, in turn, claims priority to, and the benefit of, U.S. provisional patent application Ser. No. 62/776,826 filed on Dec. 7, 2018, the disclosures of which are incorporated herein by reference in their entirety.

BACKGROUND

Technical Field

Embodiments of the present description relate to methods and devices for producing microtablets and, more particularly, to methods and devices for producing microtablets having ingestible drugs.

Background Discussion

While there has been an increasing development of new drugs for the treatment of a variety of diseases, many of such drugs that include bioactive compounds such as proteins, antibodies and peptides have limited application because they cannot be given readily formed into solid shapes or encapsulated for oral or other form of delivery. One challenge in this area is that the process of fabrication of a drug comprising a protein, peptide or antibody into tablet or other solid form can result in loss in the bioactivity of the drug denaturation or other due to disruption of the structure of the protein from the fabrication process. In this regard, many such proteins have complex internal structures that define their biological activity. Denaturation or other disruption of such structures can result in the deactivation of the drug or considerable decline of the drug's bioactivity. Fabrication processes such as molding, compression, milling, grinding or encapsulation have proven problematic in certain instances in this regard.

Thus, there is a need for a method and machine for forming bioactive compounds such as proteins, antibodies and peptides into microtablets for oral or other delivery to a human or other mammal without significant loss of bioactivity of the compound.

BRIEF SUMMARY

Embodiments of the present disclosure include improved systems and methods for manufacturing a microtablet from a precursor material such as a pharmaceutical powder. Various embodiments provide an apparatus and method for directing, collecting and compressing the powder to form a compressed mass of a selected density and repeatedly compacting the compressed mass to increase the density of the compressed mass and form a microtablet.

An aspect of the technology of the present description are apparatus and methods for manufacturing a microtablet pharmaceutical powder, incorporating a plurality of movable members variably positioned with respect to a receptacle and cavity therein for directing, collecting and/or compressing the powder into a compacted tablet form, while maintaining the integrity of the constituent parts of the pharmaceutical powder. In one embodiment, a first moveable member is positioned with respect to the receptacle, where the first moveable member may be moved from a position to its second position within a cavity to compress, compact or otherwise concentrate or direct the pharmaceutical powder to form a collected mass of powder at a first location within the cavity. The directing, compressing or compacting by first movable member can merely serve to collect the powder to a particular region in cavity or optionally serve to increase the density of the pharmaceutical powder, i.e. to have a first density, within cavity.

Compression can optionally include compressing the powder within the cavity with a second movable member in a second direction. The compressing or compacting by the second movable member can optionally serve to further increase the density of the pharmaceutical powder, i.e. to have a second density greater than the first density. The second direction movement of second movable member can optionally be orthogonal to the first direction movement of first movable member.

Compression can optionally include compressing or compacting by third movable member that can optionally serve to further increase the density of the pharmaceutical powder, i.e. to have a third density greater than the second density. Furthermore, the third movable member may further include a reciprocating member articulating in a third direction such that with each successive reciprocation of movable member, the density of the powder incrementally increases to generate a compacted solid mass at a final density and shape to form the microtablet in accordance with the present technology. The third direction of travel of third movable member can optionally be orthogonal to one or both of the direction of travel of first movable member and the direction of travel of second movable member.

Further aspects of the technology described herein will be brought out in the following portions of the specification, wherein the detailed description is for the purpose of fully disclosing embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 1:
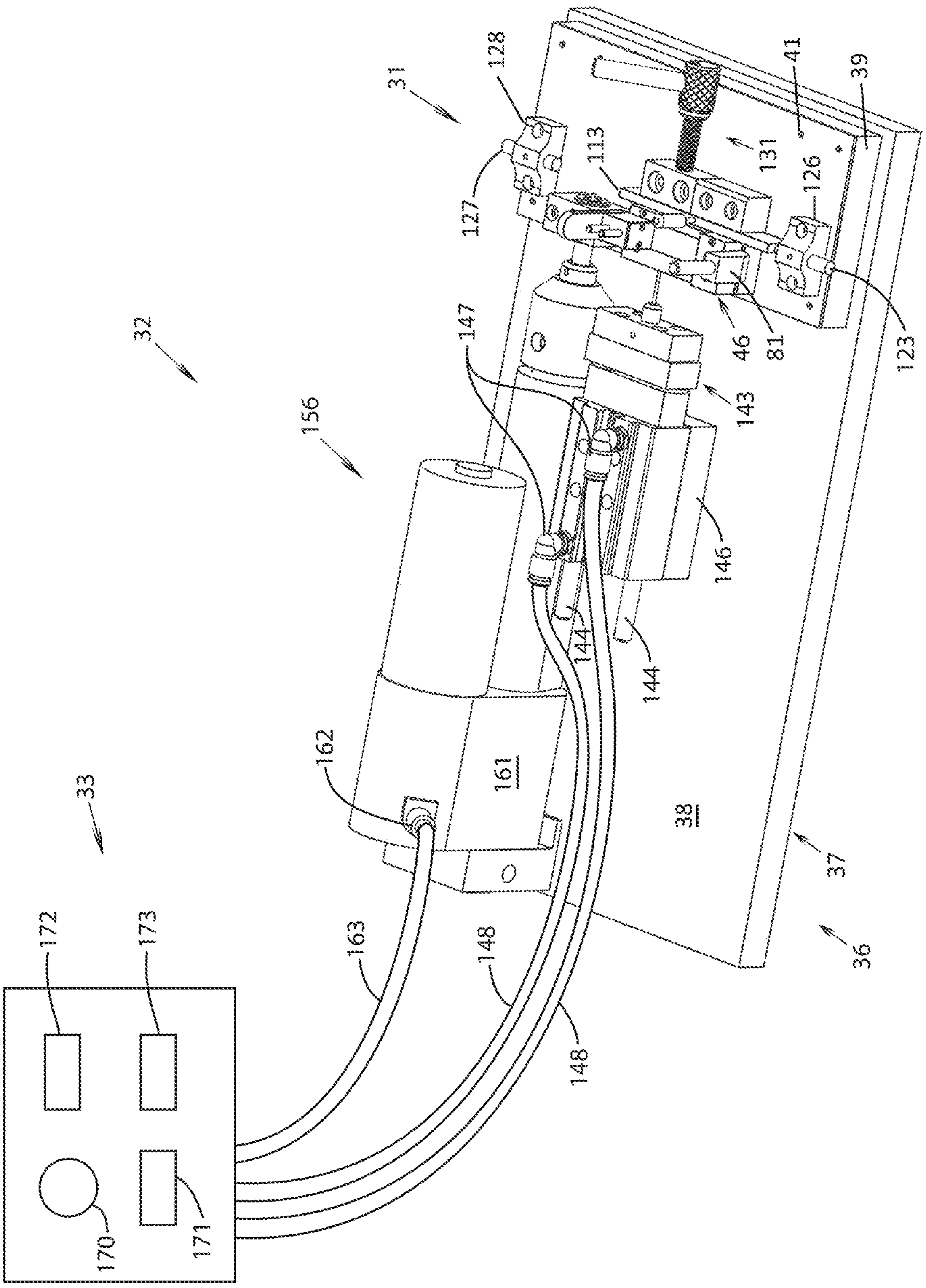
FIG. 1 is a perspective view of an embodiment of a system of the present technology for manufacturing microtablets.
Figure 2:
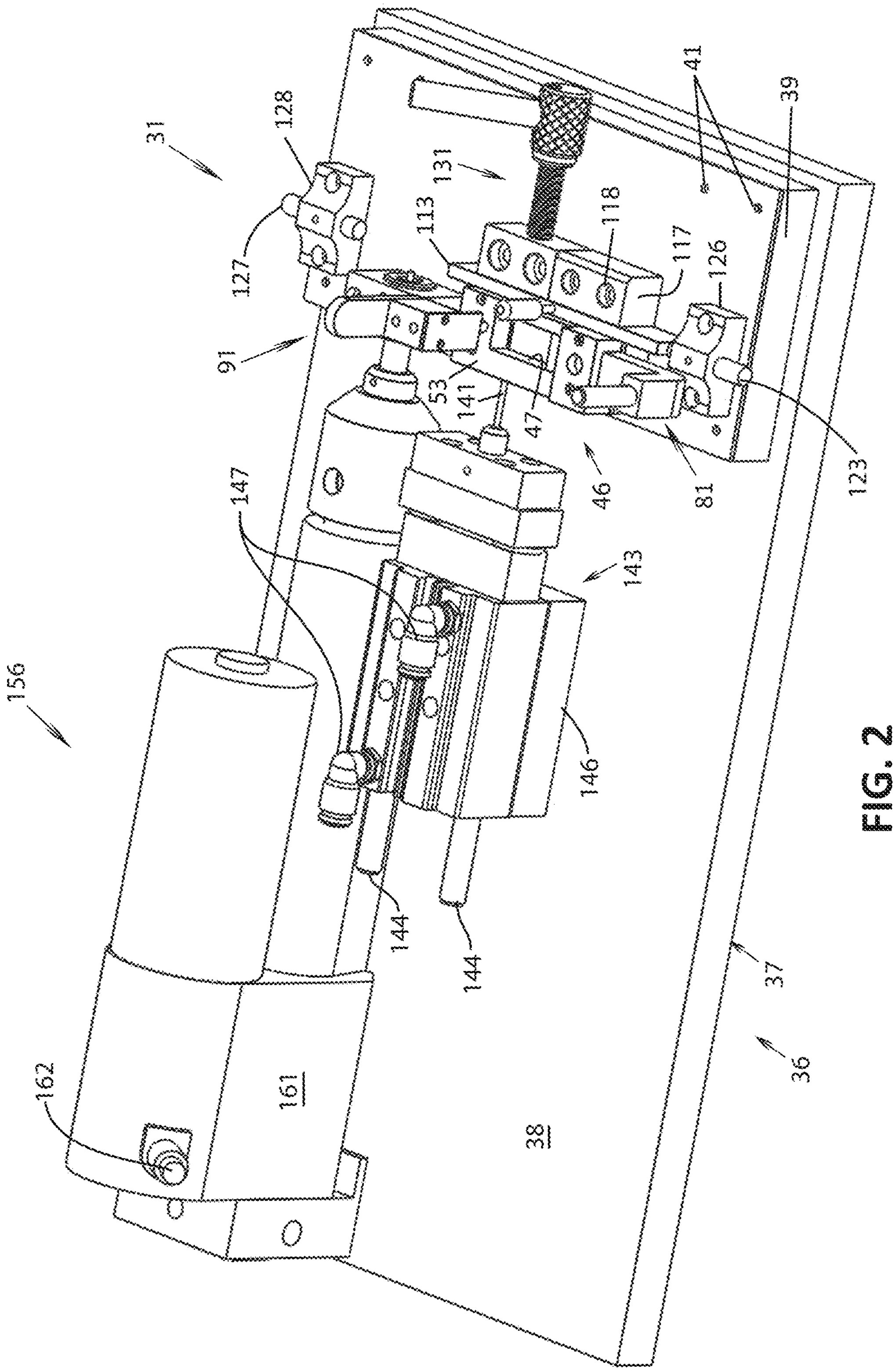
FIG. 2 is a perspective view of an embodiment of a device for manufacturing microtablets as shown in the system of FIG. 1, the device being shown in a first position.

Various embodiments of the technology provide methods and devices, which can be referred to as apparatus or machines, for fabrication and/or manufacturing of microtablets. A "microtablet" is herein referred to as a small structure having any of a number of suitable types or shapes, and may include or may be referred to as a tablet, pill, slug, compressed or compacted mass, cylindrical mass, compressed or compacted cylindrical mass, microscale-shaped mass or any combination of the foregoing. In some embodiments, the microtablet may include or be formed of a therapeutic composition. Such therapeutic composition may include any of various therapeutic substances (also referred to as a therapeutic agents), such as a pharmacologically active agent (also referred to as pharmaceutical agent) for treating a disease or other condition of a body, a vaccine, a cell (e.g., produced by or from living organisms or contain components of living organisms), a vitamin, a mineral or another nutritional supplement, or DNA or SiRNA transcripts (e.g., for modifying genetic abnormalities, conditions, or disorders).

Examples of pharmacologically active agents may include, without limitation: peptides, proteins, immunoglobulins (e.g., antibodies), large molecules, small molecules, hormones, and biologically active variants and derivatives of any of the preceding. In various embodiments, a therapeutic composition may include various excipients known in the pharmaceutical arts.

The microtablets produced by the methods and machines of the present technology can be configured to be used in combination with any suitable drug delivery system, and can be administered via any appropriate route of administration for the condition to be treated. Such routes of administration can optionally include, without limitation, oral, sublingual parenteral, intravenous, intramuscular, intra-ventricular and intra-cardiac administration. For example, a microtablet containing insulin can be taken orally and delivered into the small intestine, where the drug can be delivered into the wall of the of the small intestine or surrounding tissue such as the peritoneal wall or the peritoneal cavity. In another example, a microtablet containing insulin can be injected or otherwise placed subcutaneously into tissue, for example intramuscularly, so as to optionally dissolve to release insulin into the bloodstream.

In various embodiments, the microtablet may be formed by the shaping of a precursor material using methods and machinery described herein. The precursor material may include a therapeutic composition, where at least a portion of a biological activity (also referred to as a bioactivity) of the therapeutic composition or a constituent therapeutic agent is preserved after formation of the microtablet. The precursor material may optionally include excipients, such as a lubricant, a binder, a bulking agent, or a disintegrant. In various embodiments, manufacturing of the microtablet can be accomplished by compression or compaction of the precursor material, where the compressive or compaction forces are selected to minimize degradation of the biological activity of the drug. In various embodiments, the microtablets of the present technology can optionally have other properties such as density or particle grain size, which in some cases can be correlated to minimum levels of bioactivity (also referred to herein as biological activity) of the therapeutic composition or of a constituent therapeutic agent.

According to various embodiments, bioactivity of a therapeutic agent or composition may be correlated to structural integrity of the therapeutic agent or composition after formation of the microtablet. Such correlations may be achieved, for example, by correlating results from bioactivity assays to chemical assays, such that on a compositional level a selected percentage of the drug, for example on a weight basis, is maintained post formation relative to that in the precursor material. As noted, a therapeutic composition may optionally include a protein, peptide or antibody, and biological activity of the same in the microtablet to be at least 70% to that prior to any compression or compaction during manufacture, such as at least 90% to that prior to any compression or compaction during manufacture, or at least 95% to that prior to any compression or compaction during manufacture. These percentages may also correspond to a weight percentage of the drug remaining in the microtablet relative to that in the precursor material, for example by correlating biological activity assays to chemical assays for weight composition as described above. The microtablets of the present technology can optionally have a density in a range of about 1.00 to 1.15 $mg/mm^3$, such as about 1.02 to 1.06 $mg/mm^3$.

For convenience, the precursor material is described herein as being in the form of a powder. However, it is to be understood that for any of the examples herein, the precursor material may alternatively be one of, or a mixture of, a powder, a liquid, a slurry, or a paste. Further, the term "pharmaceutical powder" is sometimes used herein interchangeably with the term "powder".

According to various embodiments, the microtablets can optionally be configured to dissolve or otherwise degrade at a target site to release the therapeutic composition at the target site. Such target sites may correspond, for example, to a wall of a gastrointestinal tract organ (e.g., the wall of the small intestine) or surrounding tissue (e.g., the peritoneal wall or a target site in the peritoneal cavity). In additional or other alternative embodiments, the target site may correspond to subcutaneous tissue including, for example, intramuscular tissue such as in the arm, leg or buttocks.

The microtablets may optionally be inserted or otherwise incorporated into a structure, such as a tissue penetrating microneedle that is made from a biodegradable material. Suitable biodegradable materials can optionally include various sugars such as maltose and sucrose, various lactic acid polymers such as polyglycolic acid (PGA), polylactic acid (PLA) or polyglycolic lactic acid (PGLA), various polyethylenes, various celluloses such as HPMC (hydroxypropyl methyl cellulose), PVOH (polyvinyl alcohol), silicone rubber and other biodegradable polymers known in the art.

The material and other properties of the microtablet and optional microneedle can optionally be selected to produce a designed rate of degradation. For example, the rates of degradation can optionally be designed to achieve various pharmacokinetic parameters such as $t_{max}$, $C_{max}$, $t_{1/2}$, or area under the curve (AUC).

The therapeutic composition in a microtablet may include, by way of non-limiting examples: a glucose regulating protein such as insulin (e.g., human insulin and/or insulin generated using recombinant DNA methods) or an incretin such as GLP; an antibody such as IgG or an antibody from the TNF inhibiting class of antibodies such as adalimumab (HUM IRA), infliximab (Remicade), certolizumab, pegol (Cimzia), golimumab (Simponi), or etanercept (Enbrel); and/or an interleukin neutralizing protein such as an antibody which binds to one more or interleukins or their receptors (e.g., one or more of interleukins 1-36, for example interleukin 1, interleukin 17a, and their respective analogues and derivatives).

In many embodiments, the powder used to form tablets is in the form of lyophilized powder. Accordingly, a brief description will now be provided on the process of lyophilization. This description is for purposes of example only and many variations in the process are contemplated. Lyophilization, also known as freeze drying, is a process for preserving organic based materials including foods, pharmaceuticals, and biologic material (cells, yeast and antibodies). It involves three main stages or steps, including freezing, primary drying (also known as sublimation), and secondary drying (e.g., adsorption and/or desorption). In some cases, there may also be a pretreatment step prior to freezing.

Pretreatment includes any method of treating the material to be lyophilized prior to freezing. This may include concentrating the material, formulation revision (i.e., addition of excipients or other components to increase stability, preserve appearance, and/or improve processing), decreasing a high-vapor-pressure solvent, or increasing the surface area.

During the freezing stage, the material is cooled below its triple point, the lowest temperature at which the solid, liquid and gas phases of the material can coexist. This ensures that sublimation rather than melting will occur in the subsequent steps. To facilitate faster and more efficient freeze drying, larger ice crystals are preferable. The large ice crystals form a network within the product which promotes faster removal of water vapor during sublimation. To produce larger crystals, the product cam be frozen slowly or can be cycled up and down in temperature in a process called annealing. Lyophilization is easiest to accomplish using large ice crystals, which can be produced by slow freezing or annealing. However, with biological materials such as living cells, when crystals are too large they may rupture the cell walls, and that leads to less-than-ideal freeze drying results. To prevent this, the freezing may be done rapidly with a final temperature in a range between about −50° C. (−58° F.) to about −80° C. (−112° F.). For materials that tend to precipitate, annealing can be used as described above.

In the second phase of lyophilization, primary drying (sublimation), the material is placed in a chamber and pressure is lowered (to the range of a few millibars) to produce a partial vacuum, and enough heat is added to the chamber for the frozen water contained in the frozen material to sublimate (or go directly from a solid to a liquid phase). The amount of heat needed can be calculated using the sublimating molecules' latent heat of sublimation. The vacuum speeds up the process of sublimation. In many cases, a cold condenser chamber and/or condenser plate may be used to provide a surface(s) for the water vapor to re-liquefy and and/or solidify on.

About 95% of the water in the material is removed during the primary drying phase. Depending upon the material, primary drying can be a slow process (e.g., on the order of several days), because if too much heat is used this can alter or degrade the structure of the material.

Lyophilization's final phase is secondary drying (e.g., adsorption/desorption), during which any remaining water which is ionically or otherwise bound to the material is removed. This part of the freeze-drying process is governed by the material's adsorption isotherms with respect to bound water (e.g., ionically bound water). In this phase, the temperature is raised higher than in the primary drying phase, and can even be above 0° C. (32° F.), to break any physicochemical interactions (e.g., ionic or other bonds) that have formed between the water molecules and the frozen material. Usually the pressure is also lowered in this stage to encourage desorption (typically in the range of microbars, or fractions of a pascal). However, there are products that benefit from increased pressure as well. After the freeze-drying process is complete, the vacuum is usually broken with an inert gas, such as nitrogen, before the material is sealed. At the end of the operation, the final residual water content in the product is low, around 1% to 4%.

The methods and machines of the present technology can optionally provide an inventory or multiple microtablets, where a property of the microtablets, such as bioactivity of the therapeutic composition and/or density of the microtablets after formation, is substantially maintained within a selected range for substantially the entire inventory. Such methods and machines can advantageously maintain uniform dosage and pharmacokinetic parameters for the one or more selected drugs of embodiments of the microtablets of the present technology.

Embodiments of the microtablets of the present technology may be of any of a number of suitable shapes, for example: a pellet shape or a tablet, conical, cylindrical, cube, sphere or other like shape. The methods, devices and apparatus for manufacturing microtablets of the present technology from a powder (e.g., from a pharmaceutical powder disclosed herein for consumption by a human or other mammal) can optionally include compressing, compacting or pushing the powder to form a compressed mass of a density. The compressed mass may optionally be compacted thereafter to increase the density of the compressed mass.

The compressing, compacting or pushing may optionally be in the form of repeatedly compacting to increase the density of the compressed mass. In one or more embodiments, the compressed mass may be in the form of a cylinder, or be cylindrical in shape, and extend along a longitudinal axis. The compaction, whether repeated or otherwise, may be along the longitudinal axis. The compressed mass, for example a cylindrical compressed mass, may optionally be compacted or tamped into a cylindrical mold or other formation area to form the microtablet. The methods and device of the present technology can optionally be automated.

Compression may optionally include feeding powder through a funnel. Compression may include compacting the powder in at least one direction to form a compressed mass that is a compacted mass. For example, compression may include compacting the powder in a first direction and thereafter compacting the powder in a second direction to form a compressed mass that is a compacted mass, where the second direction may optionally be orthogonal to the first direction. For another example, compression may include compacting the powder in first, second and third directions, which can optionally be orthogonal to each other, to form the microtablet. The compressing or compacting can occur sequentially, simultaneously or in an overlapping manner. Any or all of the compressing or compacting may optionally be respectively performed by a movable compacting member.

The methods, devices and apparatus of the present technology can include providing material into a fill area and initiating an automated process which includes pushing the material out of the fill area into a formation area, compressing the material in the formation area into a compressed mass having a perimeter conforming to an inner surface of the formation area and ejecting the compressed mass from the formation area.

The embodiments of the present technology set forth below are examples of the present technology, and may in some instances be broader than the foregoing descriptions of the present technology but nonetheless are not intended to limit the breadth of the foregoing descriptions or the breadth of the present technology. Additional features of the present technology set forth in the embodiments below are optional. A feature of any embodiment set forth below can be combined with any or all of the foregoing descriptions of the present technology, with or without any other feature of any embodiment set forth below. All characteristics, steps, parameters and features of any method, process, apparatus, device, machine or system described below are not limited to any specific embodiments set forth below, but instead are equally applicable to the foregoing descriptions of the present technology and to all embodiments of the present technology disclosed herein. Broad terms and descriptors are replaced in some instances with more specific terms and descriptors, not to limit a disclosure to a specific term or descriptor but merely for ease of discussion and understanding.

The device, apparatus or machine of the present technology can be of any suitable type, an example of which is illustrated in FIGS. 1-16. Machine 31 therein is shown as part of a system 32, which optionally may additionally include a controller 33 of any suitable type. In various embodiments controller 33 may correspond to or include one or more of a microprocessor (not shown) or an analogue device and combination thereof. In some embodiments, controller 33 includes a processor and application programming (not shown) in the form of machine-readable instructions or code that are stored in memory (not shown) and executable on the processor for performing operations on the controller as detailed herein. Controller 33 may optionally include one or more knobs 170 for controlling various operations of the machine 31 or system 32, a gauge 171, and a plurality of timers 172, 173. Machine 31 may also be referred to as a microtableting machine.

Machine 31 may optionally include a support structure 36, which may optionally include a base 37 of any suitable type. Base 37 can optionally include a bottom plate 38 and an upper plate 39 joined to at least a portion of a top of bottom plate 38 by any suitable means such as one or more suitable fasteners 41. Base 37, including the parts thereof, can be formed from any suitable material such as metal or plastic.

Figure 3:
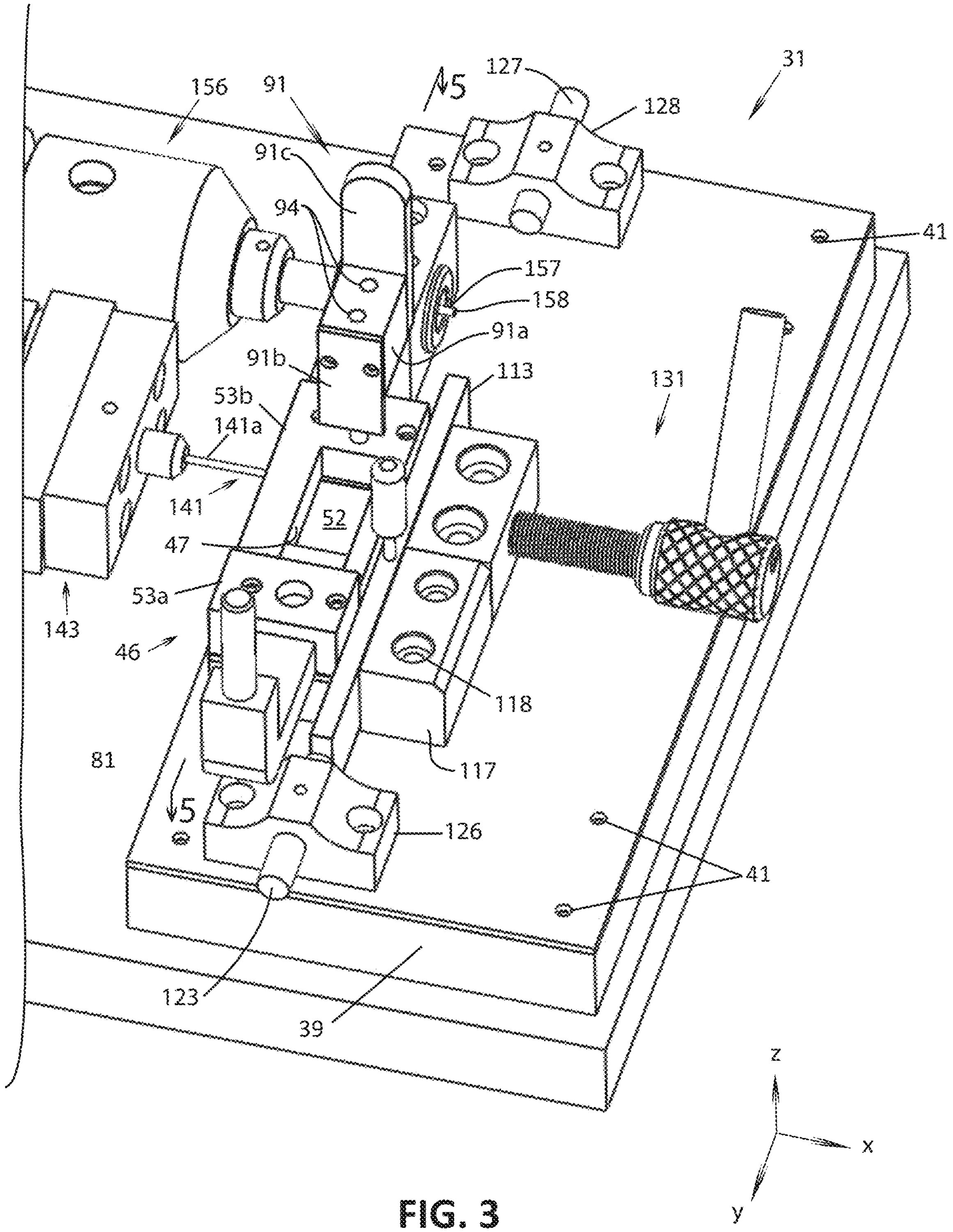
FIG. 3 is an enlarged view of a portion of the device for manufacturing microtablets shown in FIG. 2.
Figure 4:
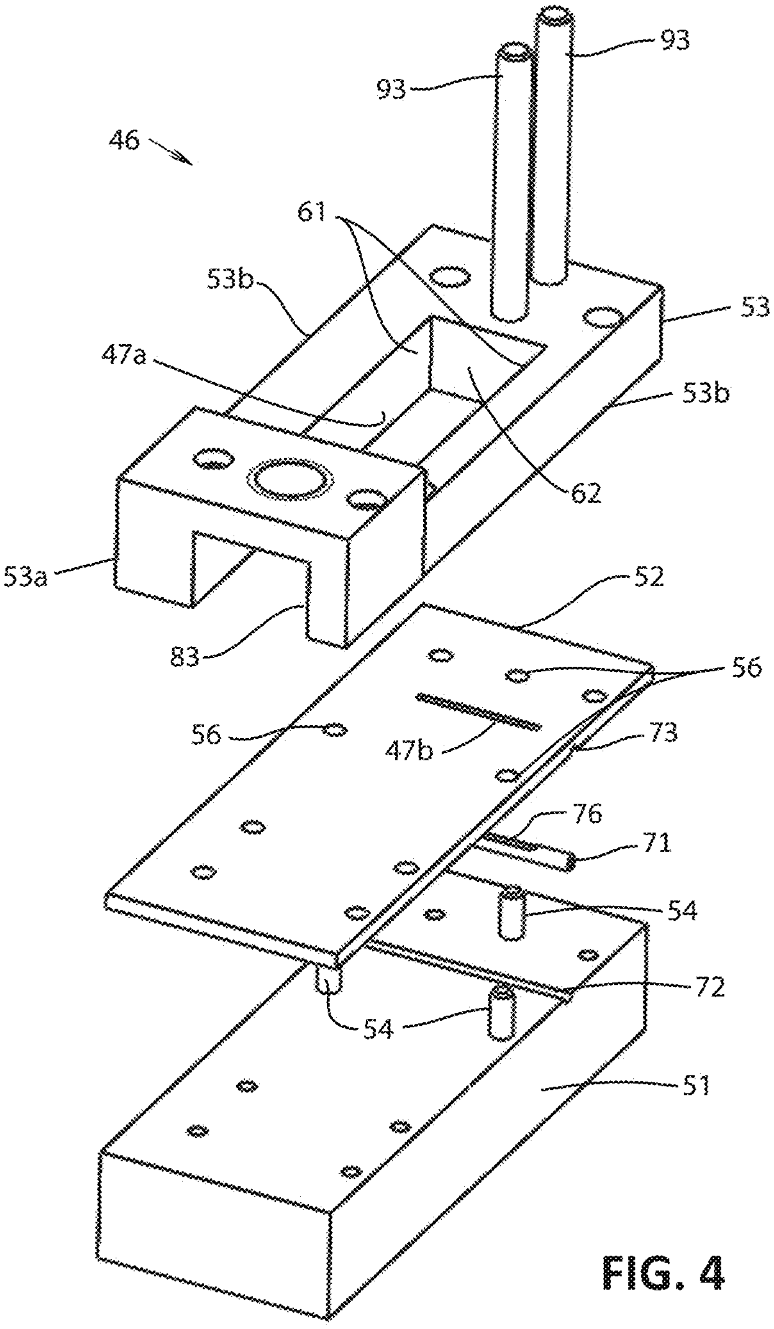
FIG. 4 is an exploded perspective view of a receptacle of the device for manufacturing microtablets shown in FIG. 2.
Figure 5:
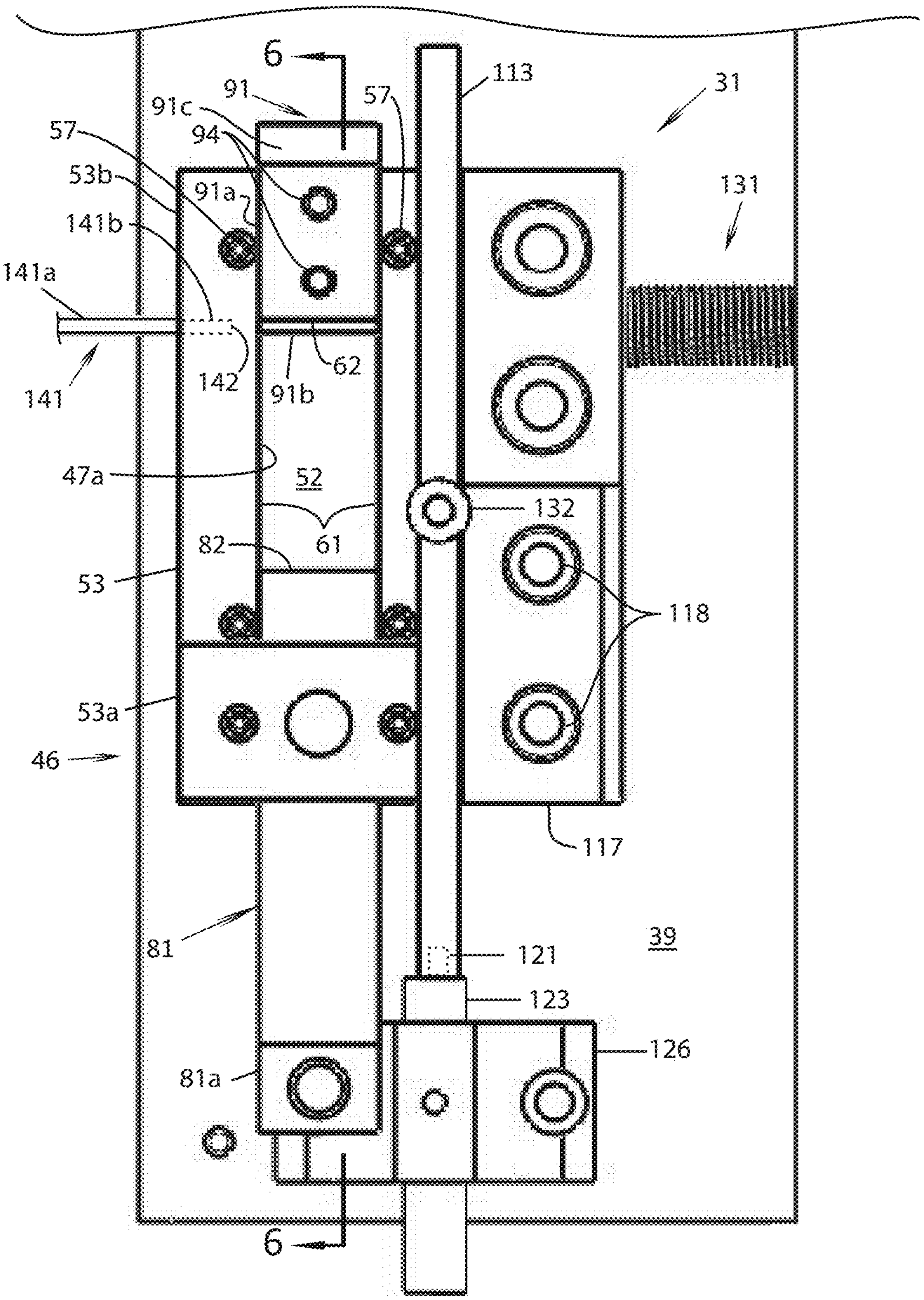
FIG. 5 is an enlarged plan view of a portion of the device shown in FIG. 2 taken along the line 5-5 of FIG. 4, illustrating a receptacle and first, second and third moveable members slideably cooperating therewith.

Referring to FIGS. 3-7, machine 31 may include a receptacle 46 providing a cavity 47 for receiving the powder from which a microtablet is to be formed. Some or all of cavity 47 may optionally be called a fill area. Receptacle 46 may be formed in any suitable manner, and can optionally be formed as an assembly of parts/layers including a lower block 51, an intermediate plate 52 and an upper block 53 having a first end 53*a* and a second end 53*b*, as illustrated in FIG. 4, secured together by any suitable means such as multiple of any suitable fasteners (not shown). Intermediate plate 52 can be registered with lower block 51 and upper block 53 by any suitable means, such as multiple registration pins 54 joined to lower block 51 and extending upwardly therefrom in any suitable pattern for alignment or registration with a respective number of openings 56 extending through intermediate plate 52 and a respective plurality of holes or openings (not shown) extending into or through upper block 53. Receptacle 46, including the parts thereof, can be formed from any suitable material such as metal or plastic, and can be joined together and to base 37 by any suitable means such as multiple of any suitable fasteners 57 (FIG. 5). In one embodiment, intermediate plate 52 is optionally a mirror-polished steel plate, which can be relatively easy to clean after contact with pharmaceutical powder. It is appreciated that receptacle 46 may also be a unitary structure that is formed from a single part, piece or component.

Cavity 47 can be of any suitable size and shape and optionally formed in one or more of the parts of receptacle 46. Referring still to FIGS. 3-7, cavity 47 can optionally include a cavity receiving portion 47*a* formed in upper block 53. Cavity receiving portion 47*a* can optionally be in the shape of a parallelepiped and formed from internal side surfaces 61 extending substantially parallel to each other, and an internal end surface 62 extending perpendicularly to internal side surfaces 61. Each of internal side surfaces 61 and internal end surface 62 can optionally be planar, and can extend through upper block 53 between and through top and bottom surfaces of upper block 53. Cavity 47 can optionally include a cavity central portion 47*b* that extends between and through top and bottom surfaces of intermediate plate 52. Cavity central portion 47*b* can optionally be rectangular in shape, when viewed in plan, and be formed from a first side surface 66 and an opposite second side surface 67 that extend substantially parallel to each other on intermediate plate 52 (FIG. 7). Second side surface 67 can optionally be co-planar with internal end surface 62 of cavity receiving portion 47*a* of cavity 47, and cavity central portion 47*b* of cavity 47 can optionally have a length at least equal to the distance between internal side surfaces 61 of cavity receiving portion 47*a* at second end 53*b* of upper block 53. As such, cavity central portion 47*b* can optionally be aligned at the end of cavity receiving portion 47*a*, and second side surface 67 of cavity central portion 47*b* can be optionally flush with internal end surface 61 of cavity receiving portion 47*a*.

Cavity 47 can optionally include a cavity lower portion 47*c*, below cavity central portion 47*b*, which can optionally be formed at least partially from an elongate member 71. Elongate member 71 can optionally be tubular or cylindrical. Elongate member 71 can optionally be made from a polished steel tube, which can be relatively easy to clean after contact with pharmaceutical powder. Elongate member 71 can be of any suitable diameter and length. In one embodiment, elongate member 71 has a diameter of 0.7 millimeters, 0.5 millimeters or smaller. In another embodiment, elongate member 71 has a diameter of 0.25 millimeters or larger. Elongate member 71 can optionally be secured between lower block 51 and intermediate plate 52 in any suitable manner, for example seated within a first slot 72 having a length extending across a width of a top of lower block 51 and a second slot 73 having a length extending across a width of a bottom of intermediate plate 52. Each of slots 72, 73 can receive elongate member 71 along at least a portion of the lengths of the slots, and can optionally have a cross-sectional configuration which conforms to an external cross-sectional configuration of elongate member 71. For example, the slots 72, 73 can each optionally be arcuate in cross-section, for example have a semicircular cross-section.

Elongate member 71 can optionally be provided with an internal passageway 74 extending along a length of elongate member 71. Further, elongate member 71 can optionally be formed with a cutout 76 along a portion of the length of elongate member 71. Such cutout 76 can optionally align with the bottom of cavity central portion 47*b* formed in intermediate plate 52. Internal passageway 74 can optionally have a cross-sectional dimension or diameter approximately equal to a width of cavity central portion 47*b*. Cutout 76 and internal passageway 74 can be referred to as cavity lower portion 47*c*.

Receptacle 46 can optionally be referred to as including a variable funnel, in that a shape and a volume of cavity 47 can change when in use. For example, a volume of the path traveled by the powder decreases, from introduction into cavity receiving portion 47*a*, through cavity central portion 47*b*, and into cavity lower portion 47*c* (e.g., into internal passageway 74 within elongate member 71). Thus, cavity 47 can be referred to as including a volume reduction area. Some or all of the portions of receptacle 46 can be referred to as a volume reduction chamber, a compaction chamber, a powder compressing chamber or any combination of the foregoing.

Figure 6:
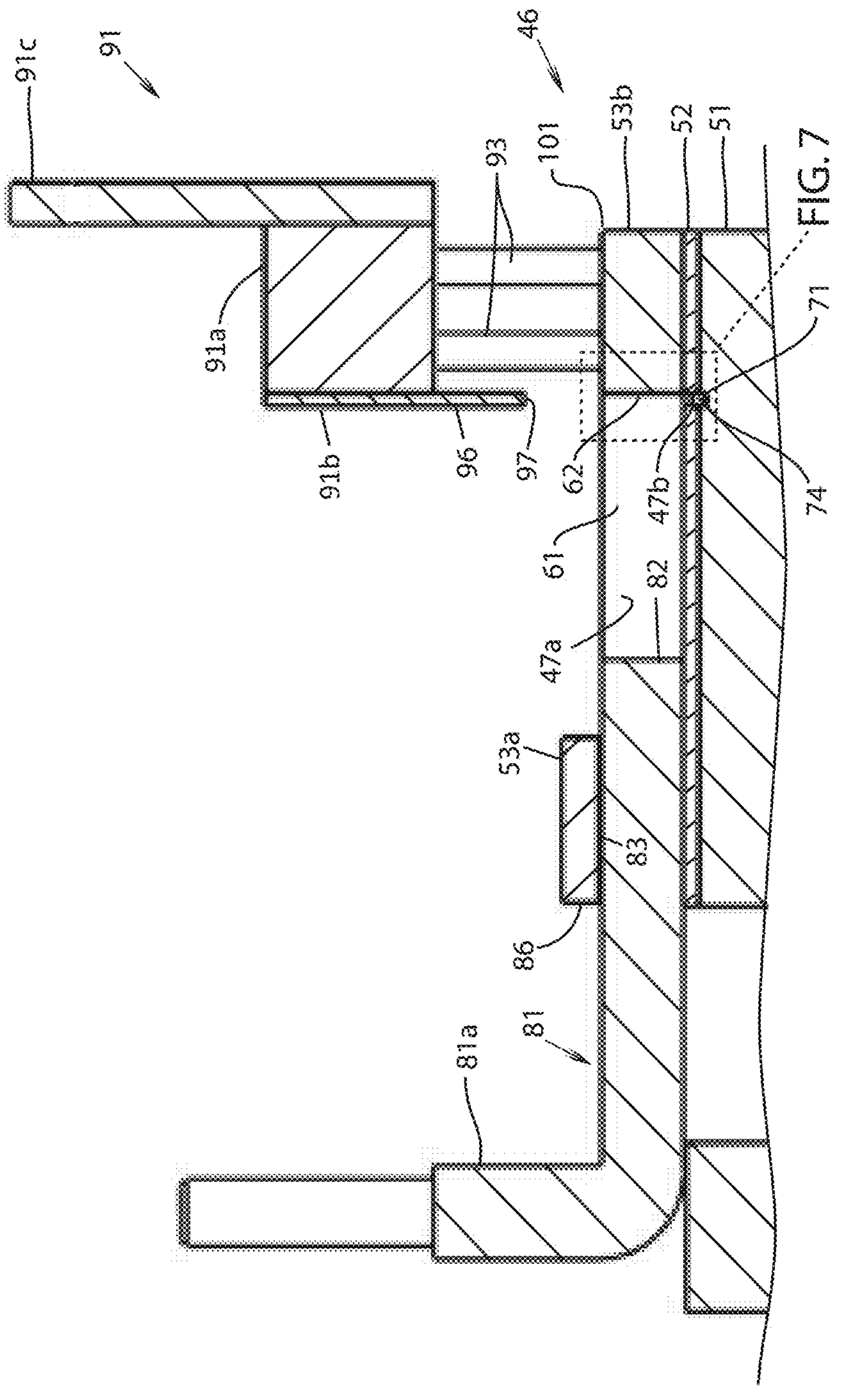
FIG. 6 is a cross-sectional view of the device components shown in FIG. 4 taken along the line 6-6 of FIG. 5.
Figure 7:
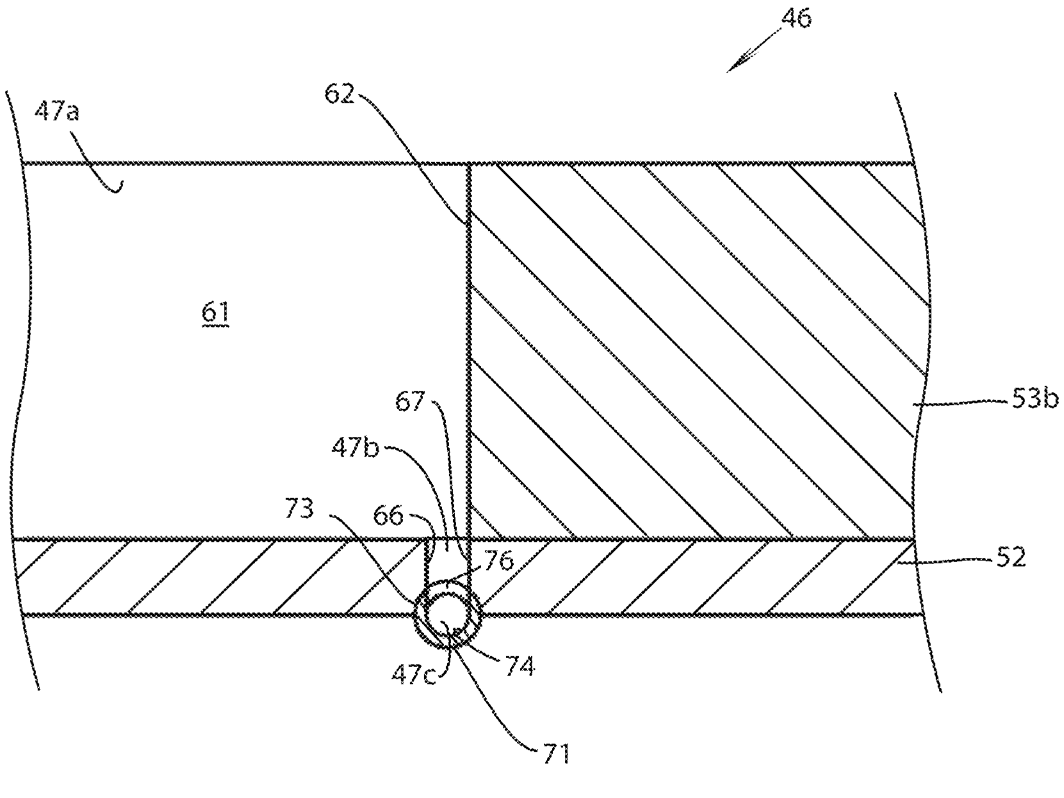
FIG. 7 is an enlarged detail view of a portion of the cross-sectional view of FIG. 4 taken along the line 6-6 of FIG. 5.

Referring to FIGS. 1-12, machine 31 can optionally include at least one movable component or member, such as a first movable member 81 slideably or movably carried by support structure 36, for example by receptacle 46, and having an end face 82 movable within cavity receiving portion 47*a* for varying a size and optionally a shape of cavity receiving portion 47*a* (see, e.g., FIGS. 3, 5, and 6). In this regard, for example, first movable member 81 can be slidable or movable between a first or open position, for example shown in FIG. 6, in which the size of cavity receiving portion 47*a* is relatively large, and a second or closed or compacting position, for example shown in FIG. 12, in which the size of cavity receiving portion 47*a* has decreased in volume and is relatively small. First movable member 81, including any multiple components thereof, can be made from any suitable material such as metal or plastic.

First movable member 81, which can be referred to as a directing, compressing or compacting component or member or as a plunger, is optionally retained in position in receptacle 46 by upper block 53. In this regard, for example, first movable member 81 can be slideably disposed within an opening 83 provided at first end 53*a* of upper block 53 (FIG. 4). Opening 83 optionally has a width equal to a distance between opposite side surfaces of first movable member 81. End face 82 (FIG. 5, FIG. 6) of first movable member 81 can optionally be sized, dimensioned and shaped to slideably engage at least side and bottom surfaces of cavity receiving portion 47*a* and inhibit any material within cavity 47 from readily passing end face 82 during movement of first movable member 81 from its first position to its second position. For example, end face 82 can optionally have a width equal to a distance between the internal side surfaces 61 of cavity receiving portion 47*a* so that material within cavity 47 cannot readily pass between end face 82 and internal side surfaces 61. First movable member 81 can optionally slide along the top of intermediate plate 52 within cavity receiving portion 47*a* with a bottom edge of first movable member 81 at end face 82 slideably engaging the top of intermediate plate 52 for inhibiting any material within cavity 47 from passing between end face 82 and intermediate plate 52.

Receptacle 46 can optionally include a limiting surface 86 (FIG. 6) for limiting the distance that end face 82 of first movable member 81 can travel within cavity receiving portion 47*a*. For example, first movable member 81 can include an upstanding portion 81*a* that engages limiting surface 86 of upper block 53 at opening 83 and thus limit the travel of first movable member 81 relative to upper block 53. For example, when in its second position, end face 82 of first movable member 81 can optionally be spaced from internal end surface 62 of cavity 47 for providing a gap or space between end face 82 and internal end surface 62. As such, first movable member 81 can serve to reduce the volume of variable cavity 47. Upstanding portion 81*a* of first movable member 81 can optionally serve as a handle for manually moving first movable member 81 between its first and second positions. It is appreciated, however, that first movable member 81 can be automatically moved or controlled, for example by any suitable actuator or motor coupled to controller 33 or any other controller of system 32.

Figure 12:
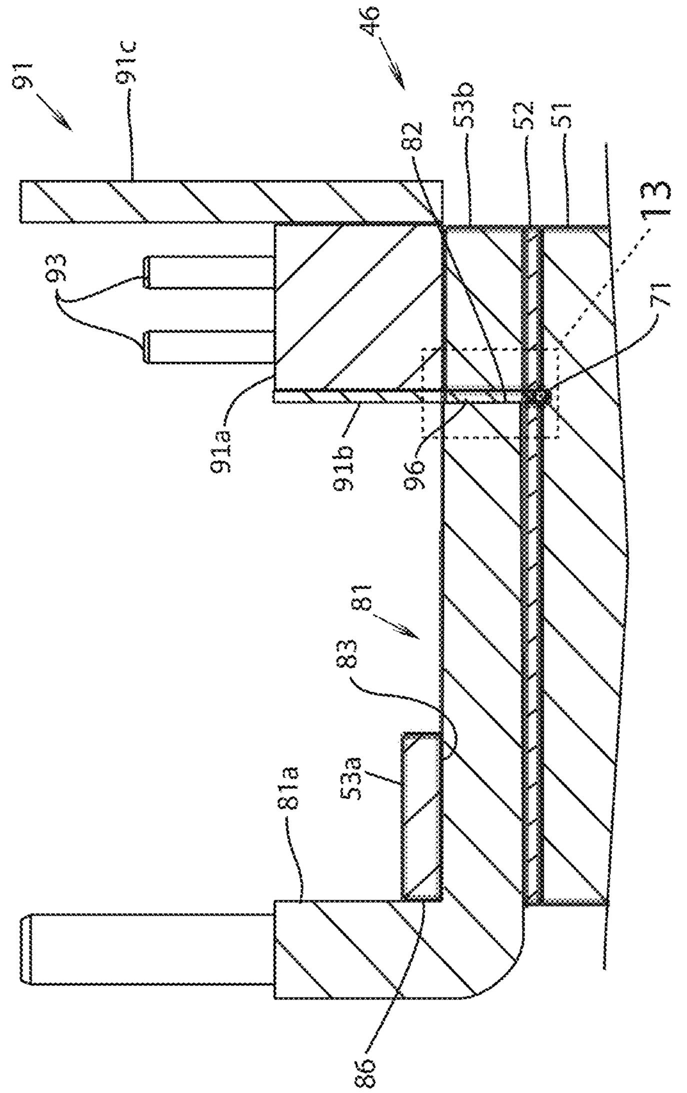
FIG. 12 shows the cross-sectional view of FIG. 6 with the device of FIG. 2 in the third position.
Figure 13:
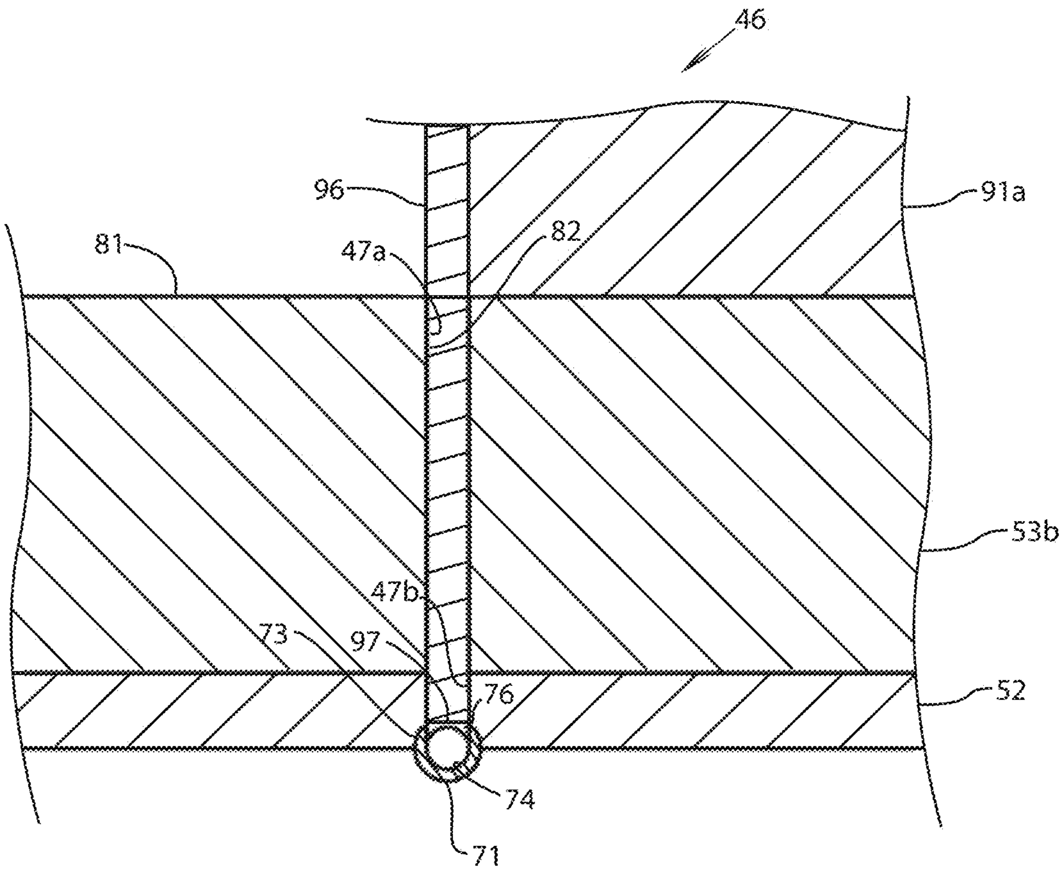
FIG. 13 is an enlarged view of a portion of FIG. 12 with the device of FIG. 2 in the third position.

Machine 31 can optionally include a second movable member 91 slideably or movably carried by support structure 36, for example by receptacle 46 movable within cavity receiving portion 47*a* for varying the size and optionally the shape of cavity receiving portion 47*a* (see FIGS. 3, 6 and 12). In this regard, for example, second movable member 91 can be slidable or movable between a first or open position, for example as shown in FIG. 6, and a second or compacting position, for example as shown in FIG. 12. Second movable member 91, including any multiple components forming second movable member 91, can be made from any suitable material such as metal or plastic.

Second movable member 91, which can be referred to as a directing, compressing or compacting component or member or a compactor or plunger, is optionally retained in position on receptacle 46 by upper block 53, for example on second end 53*b* of upper block 53. In this regard, for example, second movable member 91 can have a carriage 91*a* joined to a compactor 91*b* by any suitable means. Carriage 91*a* can optionally be slideably disposed on second end 53*b* of upper block 53 by any suitable means, for example by one or more guide posts 93 which can be slideably received within one or more aligned bores 94 (FIG.

5) extending upwardly through carriage 91*a*. Carriage 91*a* can thus be movable upwardly and downwardly on guide posts 93 for moving second movable member 91 between its first and second positions. Compactor 91*b* can be joined to carriage 91*a* by any suitable means, such as multiple fasteners (not shown). Compactor 91*b* can be of any suitable shape and optionally is in the form of a plate joined to one side of carriage 91*a* and having a compacting portion 96 extending downwardly beyond a bottom of carriage 91*a*. Compacting portion 96 can have an end face 97 which can optionally be sized, dimensioned and shaped to slideably engage at least internal side surfaces 61 and internal end surface 62 of cavity receiving portion 47*a* when first movable member 81 is in its closed or compacting position, and inhibit any material within cavity 47 from readily passing end face 97 during movement of compacting portion 96 from its first position to its second position. For example, end face 97 of compacting portion 96 can optionally have a width approximately equal to the distance between internal side surfaces 61 of cavity receiving portion 47*a* and a thickness approximately equal to a distance between end face 82 of first movable member 81 and internal end surface 62 of cavity receiving portion 47*a* when first movable member 81 is in its closed or compacting position. End face 97 moves downwardly between end face 82 and internal end surface 62, as well as between internal side surfaces 61. In one embodiment, end face 97 and compacting portion 96 form a contact or interference fit between end face 82 and internal end surface 62. As such, any material within cavity 47 cannot readily pass between end face 97 and opposite internal side surfaces 61 of upper block 53, internal end surface 62 and end face 82 as compacting portion 96 moves downwardly within cavity receiving portion 47*a* towards its second or compacting position. Compacting portion 96 of second movable member 91 optionally moves along end face 82 of first movable member 81 as it travels to it second position.

End face 97 can be of any suitable configuration, for example planar or arcuate in cross-section. End face 97 can optionally be planar and perpendicular to planar side surfaces of compactor 91*b*. End face 97 can optionally be arcuate in cross-section, for example, concave. Such a concave end face 97 can optionally have a radius approximately equal to a radius of internal passageway 74 of elongate member 71.

Upper block 53 can optionally include a limiter 101 for limiting the distance which end face 97 of second movable member 91 travels within cavity receiving portion 47*a*. In this regard, for example, an upper surface of second end 53*b* of upper block 53 can be or can include limiter 101 which is engaged by carriage 91*a* and thus serves to define the second position of compactor 91*b*. The second position of end face 97 can be in any suitable location within receiving cavity portion 47*a*. For example, end face 97 can optionally extend into cavity central portion 47*b* within intermediate plate 52 when compactor 91*b* is in its second position. End face 97 can optionally extend into cutout 76 or internal passageway 74 of elongate member 71 when compactor 91*b* is in its second position.

Second movable member 91 can optionally include a handle 91*c*, for example extending upwardly from one side of carriage 91*a*, for manually moving second movable member 91 between its first and second positions. It is appreciated, however, that second movable member 91 can be automatically moved or controlled, for example by any suitable actuator or motor coupled to controller 33 or any other controller of system 32.

Figure 8:
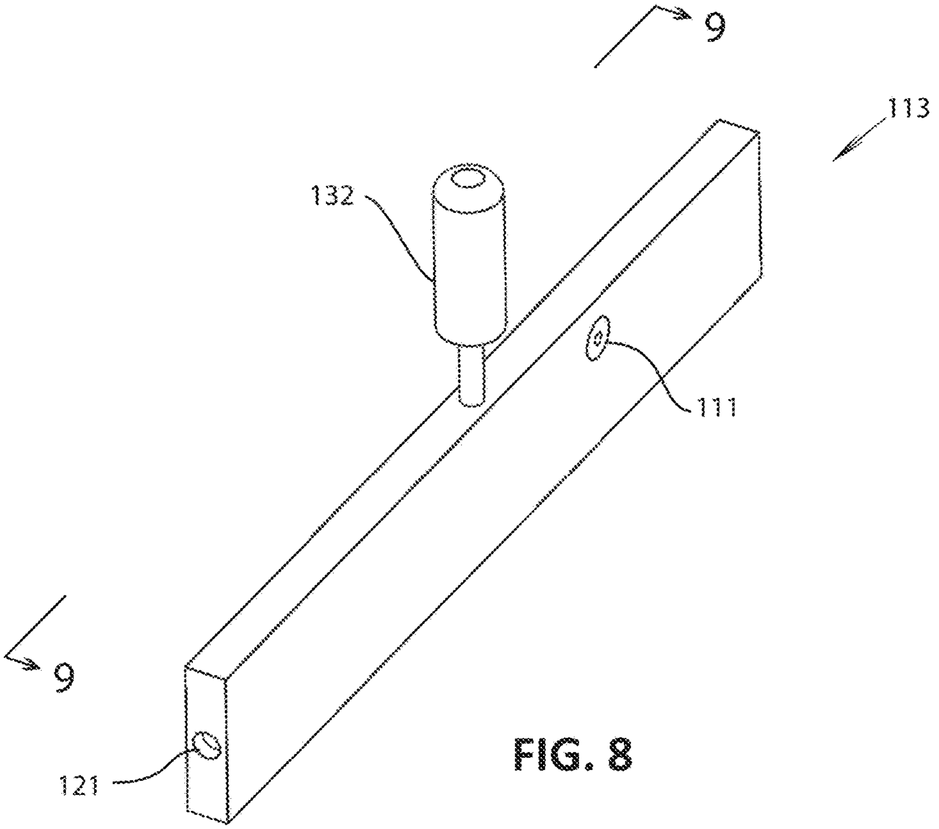
FIG. 8 is a perspective view of a slide shown in device illustrated in FIG. 1 through FIG. 5.
Figure 9:
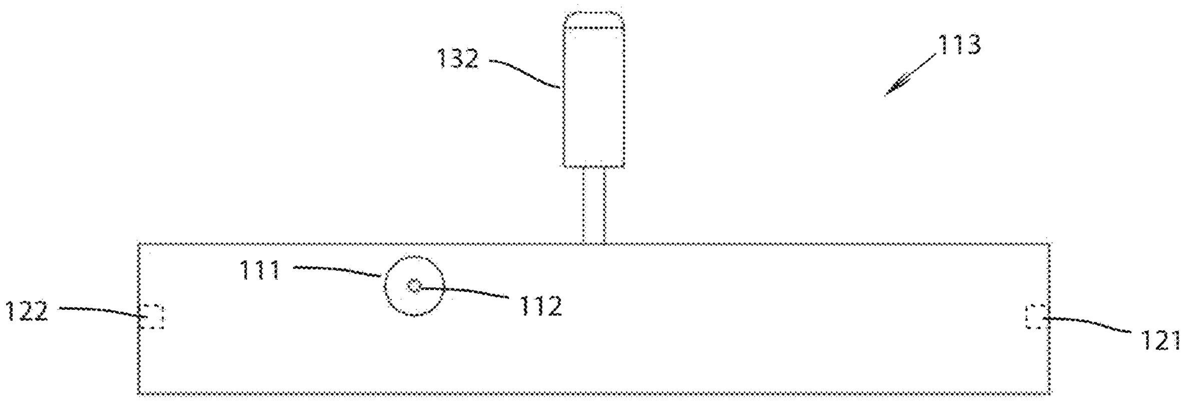
FIG. 9 is a side view of the slide of FIG. 8.
Figure 10:
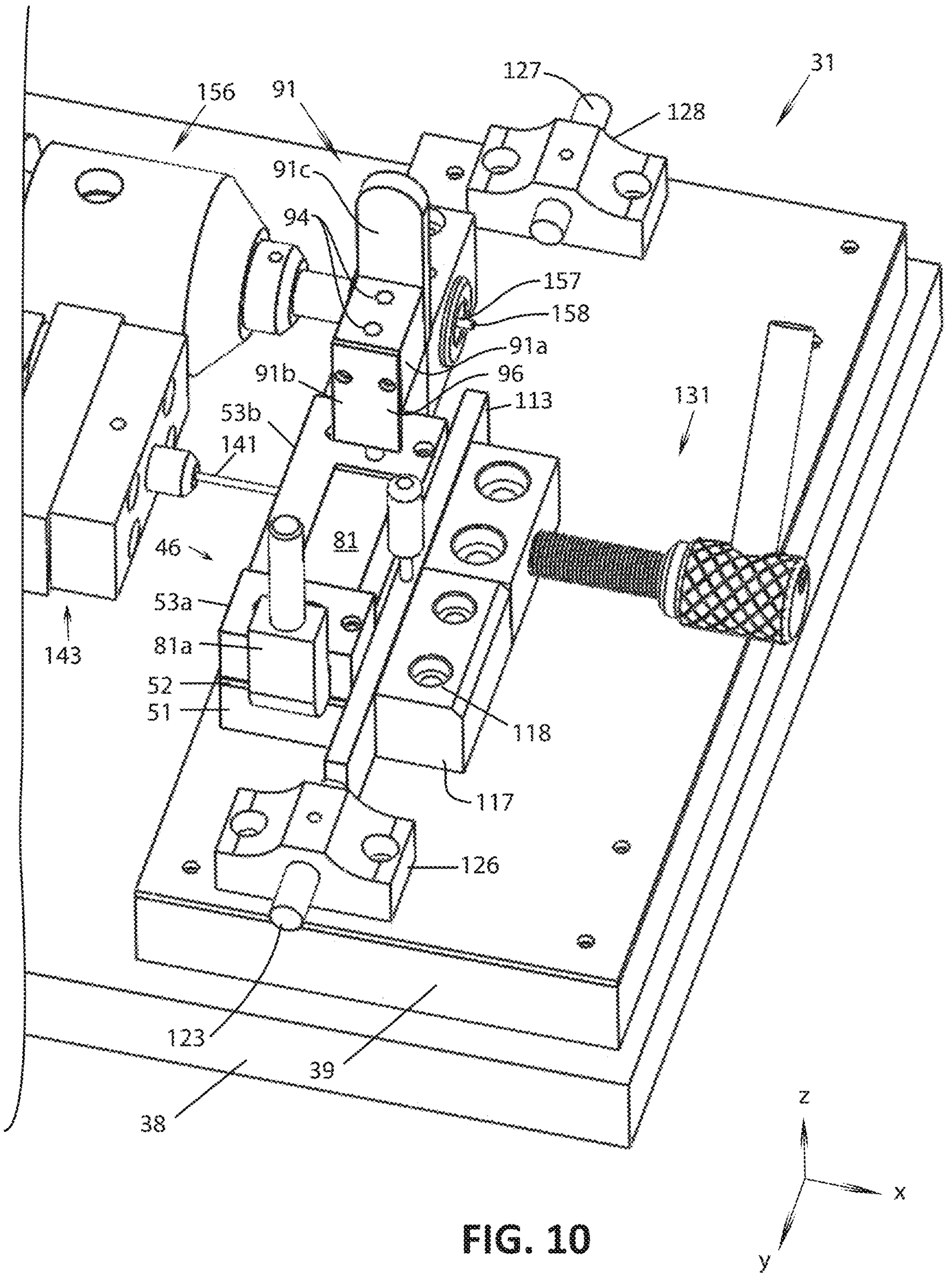
FIG. 10 is an enlarged perspective view of a portion of the device of FIG. 2 in a second position.
Figure 11:
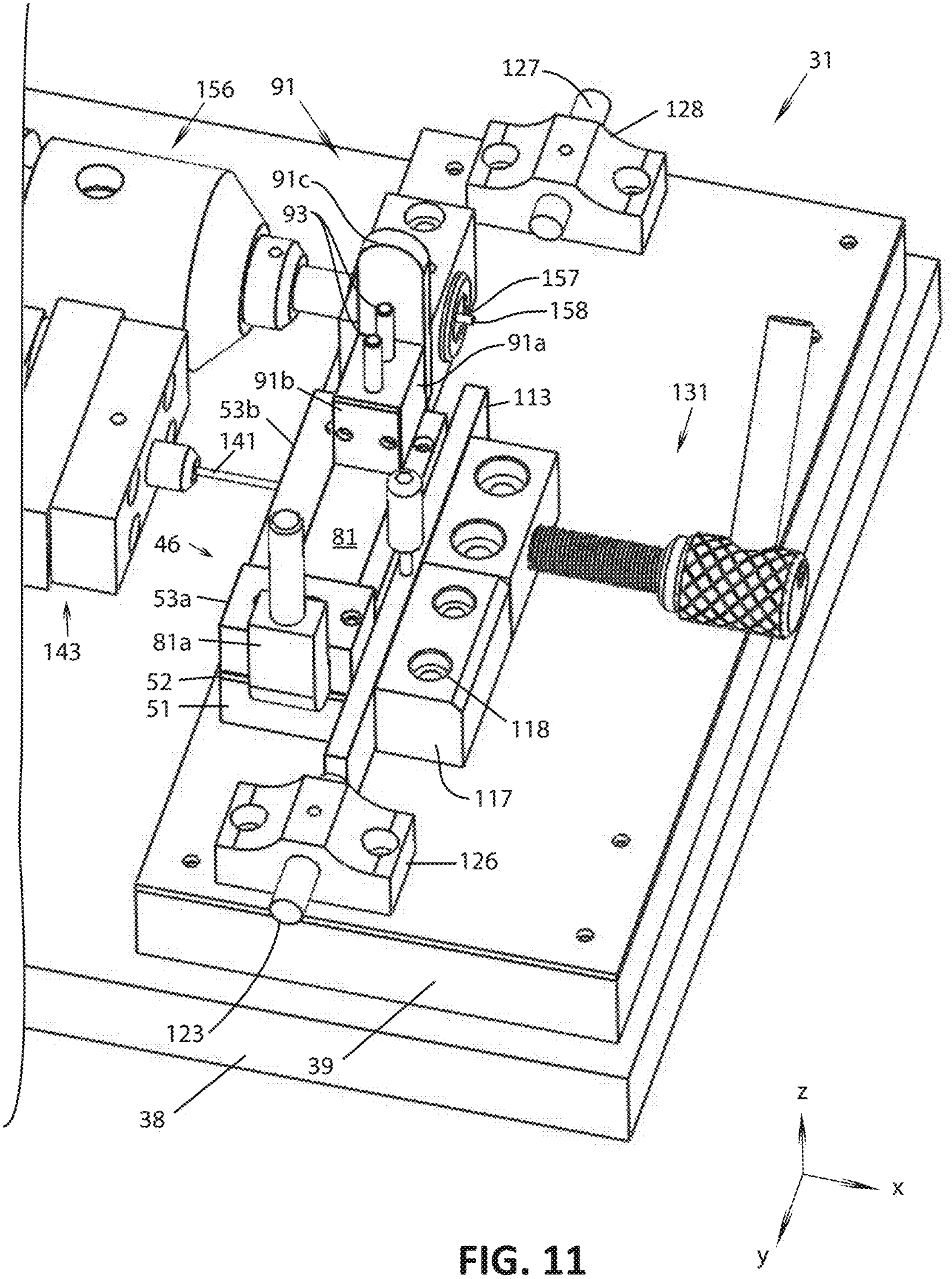
FIG. 11 is an enlarged perspective view of a portion of the device of FIG. 2 in a third position.
Figure 14:
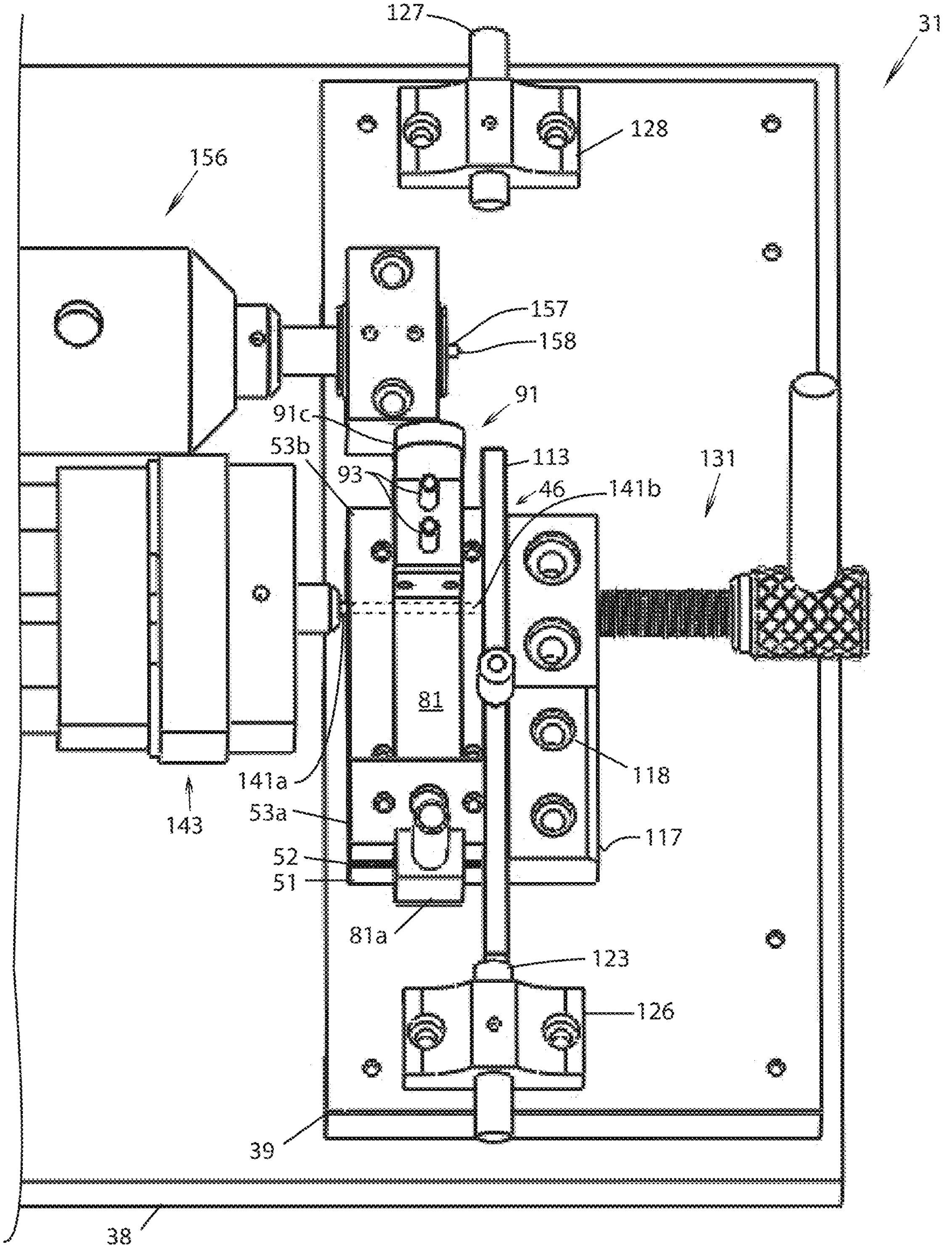
FIG. 14 is an enlarged perspective view of a portion of the device of FIG. 2 in a fourth position.
Figure 15:
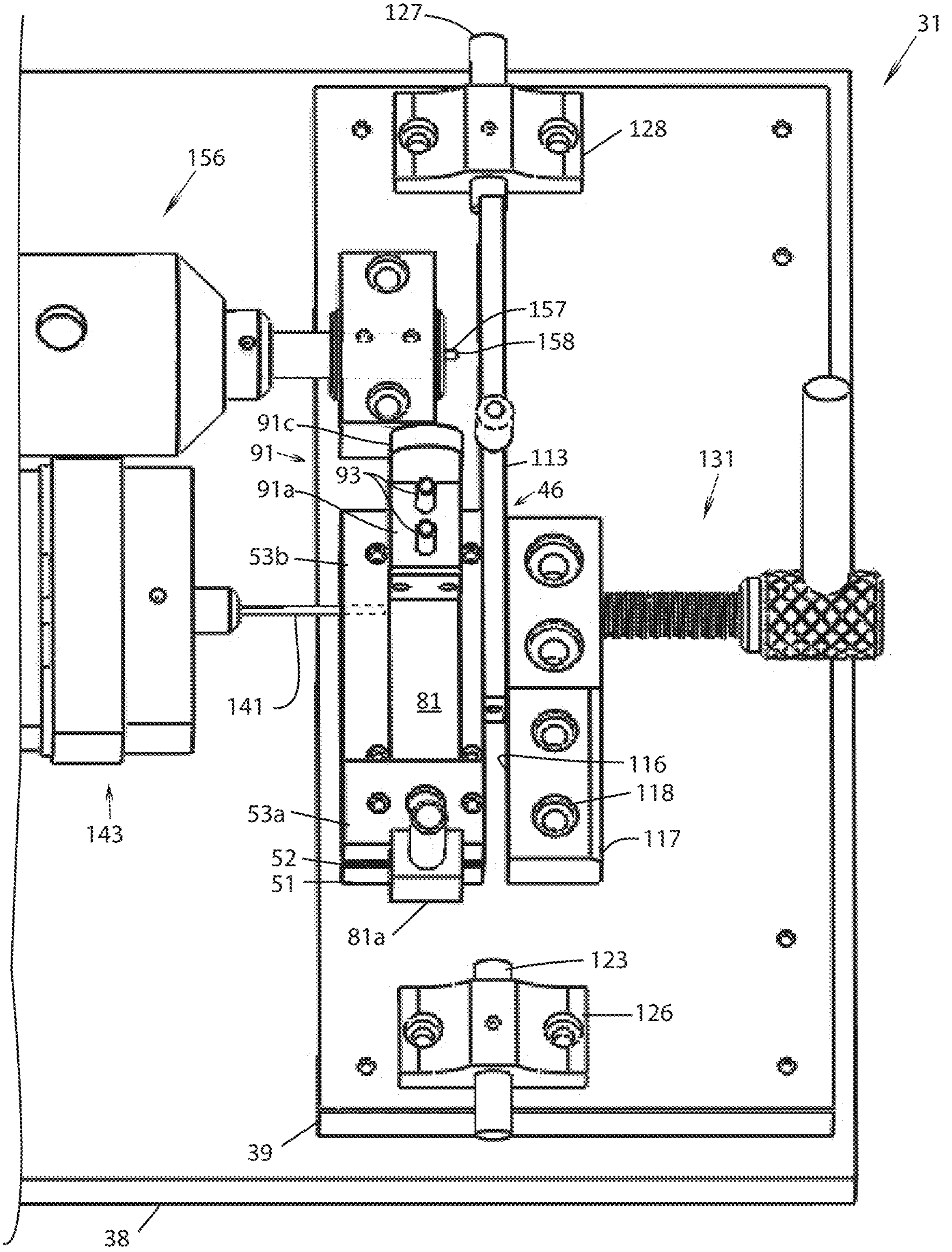
FIG. 15 is an enlarged perspective view of a portion of the device of FIG. 2 in a fifth position.

Referring to FIGS. 1-15, and in particular FIG. 8 and FIG. 9, machine 31 can optionally include a mold 111 having a recess 112 for forming the microtablet of the present technology. Mold 111 can be referred to as a formation portion and recess 112 can be referred to as a formation area. Machine 31 can optionally be configured so that mold 111 receives compressed and/or compacted powder from internal passageway 74 of elongate member 71. In this regard, for example, machine 31 can include a mold carrier. The mold carrier can be of any suitable size and shape, for example an elongate plate such as a slide 113, made from any suitable material such as metal or plastic. Slide 113 can be slideably carried by support structure 36 between a first position, for example as shown in FIG. 14, and a second position, for example as shown in FIG. 15. Mold 111 can be formed integral with slide 113, for example from the same material as slide 113, or be formed from a different material of slide 113 and secured within the slide. Mold 111 can optionally be cylindrical. Recess 112, which can be formed by an inner surface of mold 111, can optionally be in a form of a cylinder and have an opening on both sides of slide 113. Recess 112 can optionally have a width or diameter of 0.7 millimeters, such as 0.5 millimeters or smaller, for forming a microtablet of such dimension. Recess 112 can optionally have a width or diameter of 0.25 millimeters or larger, for forming a microtablet of such dimension. Recess 112 can optionally have a length of 0.5 millimeters, 1.0 millimeters or 10 millimeters, in combination with any of the foregoing diameters or any other suitable diameter, for forming a microtablet of selected dimensions. Recess 112 optionally has a length and a diameter or width that corresponds to or is equal to the length and diameter or width of the microtablet being formed by machine 31. Recess 112 can optionally have a length greater than the length of the microtablet being formed, for example for forming more than one microtablet in recess 112.

Machine 31 can optionally include a track 116 for slideably receiving slide 113 (FIG. 15). Track 116 can optionally be formed from receptacle 46 and at least one additional block 117 spaced from receptacle 46, for example a distance approximately equal to the width of slide 113. The additional block 117 can be secured to support structure 36 by any suitable means, for example multiple fasteners 118 of any suitable type. When slide 113 is in its first position, which can be referred to as a receiving position, one end of recess 112 of mold 111 is optionally aligned with an open end of internal passageway 74 of receptacle 46 and the other end of recess 112 is closed off, for example by block 117. When slide 113 is in its second position, which can be referred to as an eject position, recess 112 of mold 111 is optionally accessible at both ends of the recess, for example on both sides of slide 113. Slide 113 can be secured in either or both of its first and second position by any suitable means, for example by a first magnet 121 provided on one end of slide 113 and a second magnet 122 provided on the other end of the slide (FIG. 9). First magnet 121 optionally engages a third magnet 123 carried by support structure 36 by any suitable means such as a first stop 126 when slide 113 is in its first position. Second magnet 122 optionally engages a fourth magnet 127 carried by support structure 36 by any suitable means such as a second stop 128 when the slide is in its second position. Slide 113 can optionally be locked in either or both of its first and second positions by any suitable means such as a locking mechanism 131 carried by support structure 36 by any suitable means. Locking mechanism 131 can be of any suitable type, for example a locking clamp. An additional block 117 (not shown) may optionally be provided in the y direction on the other side of locking mechanism 131 to provide support for the slide 113 when in the second position.

Slide 113 can optionally include a handle 132 (FIG. 9), for example extending upwardly from the top of slide 113, for manually moving slide 113 between its first and second positions. It is appreciated, however, that slide 113 can be automatically moved or controlled, for example by any suitable actuator coupled to controller 33 or any other controller of system 32.

Machine 31 can optionally include a third movable member 141 slideably or movably carried by support structure 36, for example by receptacle 46 (see FIGS. 2, 5, 14 and 15). Third movable member 141 can include a first end portion 141*a* and an opposite second end portion 141*b* having an end face 142 movable within cavity 47, for example cavity lower portion 47*c*, for varying the size and optionally the shape of a portion of cavity 47, for example cavity lower portion 47*c*. In this regard, for example, third movable member 141 can be slidable or movable between a first or retracted position, for example as shown in FIG. 5, in which end face 142 is outside of cavity lower portion 47*c*, and a second or compacting position, for example as shown in FIG. 14, in which end face 142 extends at least into cavity lower portion 47*c*. Third movable member 141 can optionally be disposed within first slot 72 and optionally within a first end of internal passageway 74 of elongate member 71 when in its first position. The third movable member can optionally be further disposed within internal passageway 74, for example in the vicinity of a second end of internal passageway 74 or within recess 112, when in its second position.

Third movable member 141 can be of any suitable size and shape, such as an elongate cylinder, rod or pin extending along a longitudinal axis. Third movable member 141 can be referred to as a gauge pin, a compression cylinder, rod or pin, a compressing or compacting component or member, a plunger, a compactor, a reciprocating member, a repetitive action member, component or compactor. Third movable member 141 can be made from any suitable material, such as hardened steel or another material that inhibits bending of the movable member. End face 142 of third movable member 141 can be of any suitable shape, for example a planar surface extending orthogonal to the longitudinal axis of third movable member 141.

Third movable member 141 is optionally retained in position on or within receptacle 46 by any suitable member or assembly. In this regard, for example, first end portion 141*a* of third movable member 141 can be carried by or joined to a holder 143 of any suitable type. The holder, which can be made from any suitable material such as metal or plastic, can optionally be formed from one or more blocks or components slideably carried on one or more rails 144 carried by support structure 36. Rails 144 can optionally be mounted on a support 146 joined to base 37, for example bottom plate 38, by any suitable means. Holder 143 can optionally be referred to as a slide.

Third movable member 141 can optionally be automatically moved or controlled, for example by any suitable actuator or motor (not shown) coupled to controller 33 or any other controller of system 32, between its first and second positions. Such actuator can optionally be a pneumatic actuator having ports 147, which can be respectively coupled to controller 33 by lines 148 or any other suitable means. The actuator, as controlled by controller 33, can move or reciprocate third movable member 141 between its first and second positions at any suitable speed, rate or frequency. The actuator can optionally control the pressure or force exerted by end face 142 of third movable member 141 on the powder forming the microtablet of the present technology, including the duration of such pressure or force.

Figure 16:
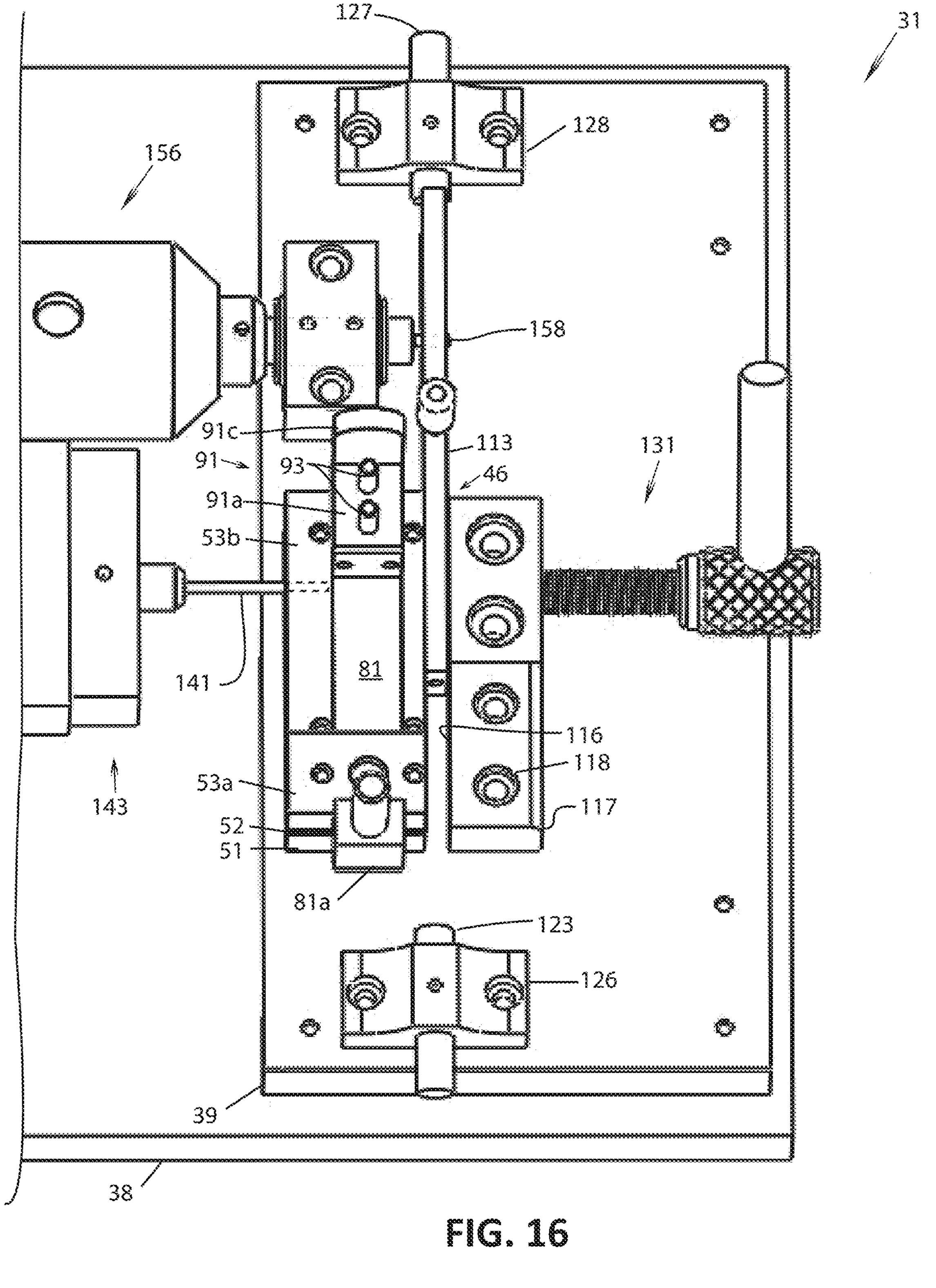
FIG. 16 is an enlarged perspective view of a portion of the device of FIG. 2 in a sixth position.

Machine 31 can optionally include an ejector 156 for moving the compacted or cylindrical mass formed by machine 31 out of recess 112 of mold 111, for example when slide 113 is in its second position (see FIGS. 15 and 16). Ejector 156 can be of any suitable type, and can optionally include a pin 157 (FIG. 3), which can optionally be cylindrical in shape. Pin 157 can have an end face 158. A cross-section of pin 157 is not greater in cross-sectional size or shape than the cross-section of recess 112, and can be of the same cross-sectional size and shape of recess 112. Ejector 156 can be carried by support structure 36, for example by base 37, in any suitable manner.

Pin 157 can be movable between a first or retracted position, for example as shown in FIG. 15, in which end face 158 is outside of recess 112, and a second or extended position, for example as shown in FIG. 16, in which end face 158 is at least partially disposed, fully disposed or extending through recess 112 for urging the compacted or cylindrical mass formed by machine 31 out of the recess.

Ejector 156 can include a suitable actuator 161 (e.g., a motor), which can be coupled to controller 33 or any other controller of system 32, for moving pin 157 between its first and second positions. Such actuator 161 can optionally be a pneumatic linear actuator having at least one port 162 coupled to controller 33 by at least one line 163. Actuator 161, as controlled by controller 33, can move pin 157 from its first position to its second position at any suitable speed. Actuator 161 can optionally control the pressure or force exerted by end face 158 of pin 157 on the powder forming the microtablet of the present technology, including the duration of such pressure or force.

The device, apparatus or machine of the present technology can have other configurations. A machine 191, illustrated in FIGS. 17-20, can be included in system 32, which can optionally, additionally include controller 33 or any other suitable controller. Machine 191, which can be referred to as a microtableting machine, can optionally include a support structure 192 having a base that can include vertical plate 193. Support structure 192, including vertical plate 193, can be formed from any suitable material such as metal or plastic.

Figure 19:
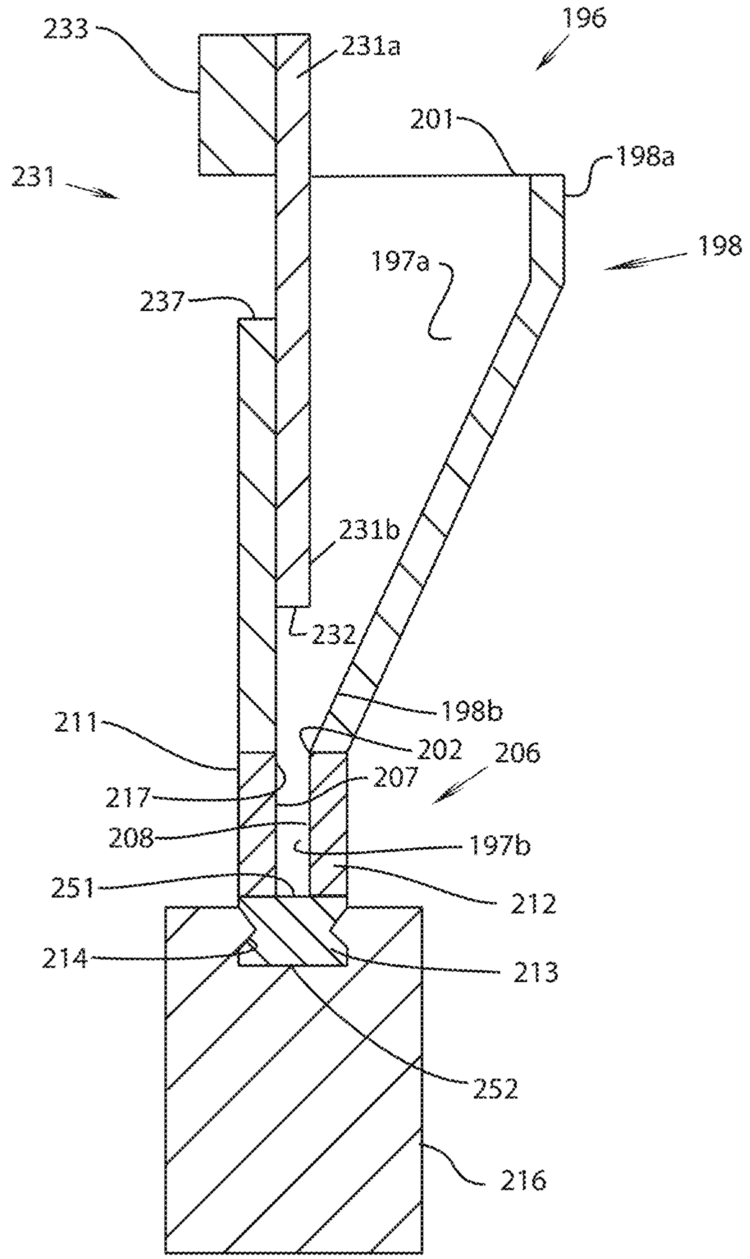
FIG. 19 is a cross-sectional view of the device for manufacturing microtablets of FIG. 17 taken along the line 19-19 of FIG. 18.

Machine 191 includes a receptacle 196 provided with a cavity 197 for receiving the pharmaceutical powder from which a microtablet of the present technology is formed. Some or all of cavity 197 can optionally be called a fill area. Receptacle 196, including the parts thereof, can be formed from any suitable material such as metal or plastic. Receptacle 196 can be of any suitable type, and can optionally include a first or upper portion, which can optionally be in the shape of a funnel and is referenced herein as funnel 198. Funnel 198 can be formed from first and second side sections, components or portions 199, which can be joined together by any suitable means. Referring to FIG. 19, the upstanding or vertical funnel 198, shown as extending along the z axis in FIG. 17, has an upper portion 198*a* and a lower portion 198*b*, and reduces in size and cross-sectional area, or tapers or narrows inwardly, from its upper portion to its lower portion. A cavity receiving portion 197*a* is formed by the funnel, which has an upper opening 201 at the top of upper portion 198*a* for providing the pharmaceutical powder to cavity receiving portion 197*a* and a smaller lower opening 202 at the bottom of lower portion 198*b* of funnel 198 for permitting the pharmaceutical powder to exit cavity receiving portion 197*a*. Like funnel 198, cavity receiving portion

197*a* reduces in size and cross-sectional area, or tapers or narrows inwardly, from upper opening 201 to lower opening 202.

Figure 20:
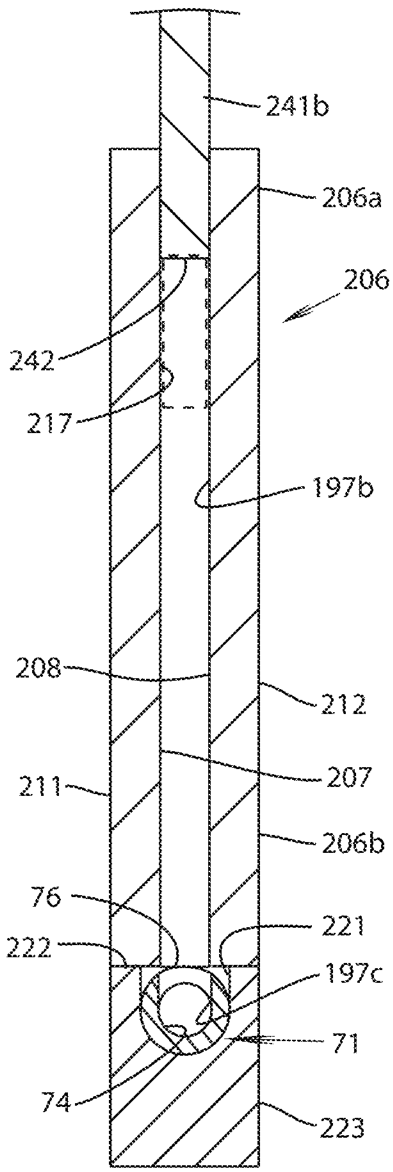
FIG. 20 is a cross-sectional view of the device for manufacturing microtablets of FIG. 17 taken along the line 20-20 of FIG. 18.

Receptacle 196 optionally includes a receptacle central portion 206 joined to lower portion 198*b* of funnel 198. Receptacle central portion 206 can optionally be elongate, extending along a longitudinal axis aligned substantially orthogonal to funnel 198, such as along the y axis identified in FIG. 17 that is orthogonal to the z axis in FIG. 17. Referring to FIG. 20, receptacle central portion 206 can have a first end portion 206*a* and an opposite second end portion 206*b*. Receptacle central portion 206 has an elongate chamber extending longitudinally therethrough between first end portion 206*a* and second end portion 206*b*, which can be referred to as a cavity central portion 197*b* of cavity 197. Cavity central portion 197*b* is formed from opposite first and second internal surfaces 207, 208 of respective side walls 211, 212 of receptacle central portion 206 that extend substantially parallel to each other. Receptacle central portion 206 further includes a base plate for forming the bottom of cavity central portion 197*b*. The base plate is referred to herein as a slide 213, and sits flush with the bottom of side walls 211, 212 so as to seal the bottom of cavity central portion 197*b* with respect to the side walls. Slide 213 is optionally disposed for slidable travel with respect to side walls 211, 212 in a track 214 provided in a base block 216 of support structure 192. Base block 216 can optionally be joined to vertical plate 193 by any suitable means. Cavity central portion 197*b* can optionally be rectangular in shape, for example when viewed from its end as in FIG. 19 and when viewed in plan as in FIG. 20. Cavity central portion 197*b* can optionally be referred to as cylindrical in shape along its length between first end portion 206*a* and second end portion 206*b*, and optionally has a constant internal cross-sectional shape and area along its length and can be referred to as having the shape of a parallelepiped (see FIGS. 19 and 20). Receptacle central portion 206 is provided with an upper opening 217, for example in first end portion 206*a*, that communicates with lower opening 202 of funnel 198 for permitting material in cavity receiving portion 197*a* formed by the funnel to enter cavity central portion 197*b*.

Cavity 197 can optionally include a cavity end portion 197*c*, at the end of cavity central portion 197*b*, which can optionally be formed at least partially from elongate member 71. Elongate member 71 can have any or all of the configurations, materials and other features discussed above with respect to machine 31. Elongate member 71 can optionally be carried by support structure 192 in any suitable manner, for example within a slot 221 extending vertically along a surface 222 of an end block 223 joined to second end portion 206*b* of receptacle central portion 206 by any suitable means. Slot 221 can receive elongate member 71 along at least a portion of the length of the slot, and can optionally have a cross-sectional configuration which conforms to the external cross-sectional configuration of elongate member 71. For example, slot 221 can optionally be arcuate in cross section, for example have a semicircular cross-section. Elongate member 71 can optionally be provided with internal passageway 74 extending along the length of elongate member 71. Further, elongate member 71 can optionally be formed with cutout 76 along a portion of its length. Cutout 76 can optionally align with the end of cavity central portion 197*b* formed in second end portion 206*b* of receptacle central portion 206. Internal passageway 74 can optionally have a cross-sectional dimension or diameter approximately equal to the width of cavity central portion 197*b*. Cutout 76 and internal passageway 74 can be referred to as cavity end portion 197*c*.

Some or all of the portions of receptacle 196 can optionally be referred to as a variable funnel in that the shape of cavity 197 can change when in use and the volume of cavity 197 can likewise change when in use. For example, the volume of the passageway traveled by the pharmaceutical composition or powder from the entrance of cavity 197, that is the entrance of cavity receiving portion 197*a*, to internal passageway 74 within elongate member 71 at cavity end portion 197*c*, decreases in volume along the course of such travel. Some or all of the portions of cavity 197 can be referred to as a volume reduction area. Some or all of the portions of receptacle 196 can be referred to as a volume reduction chamber, a compaction chamber, a powder compressing chamber or any combination of the foregoing.

Machine 191 can optionally include at least one movable component or member, which can optionally include a first movable member 231 slideably or movably carried by support structure 192, for example by receptacle 196, and movable within cavity receiving portion 197*a* for varying the size and volume of cavity receiving portion 197*a* (see FIG. 19). In this regard, for example, first movable member 231 can be slidable or movable between a first or retracted position, for example shown in FIGS. 17-19, in which the size of cavity receiving portion 197*a* is relatively large, and a second or extended or compacting position, not shown, in which the size of cavity receiving portion 197*a* has decreased in volume and is relatively small. First movable member 231, including any multiple components thereof, can be made from any suitable material such as metal or plastic.

First movable member 231 optionally includes a first end portion 231*a* and a second end portion 231*b* having an end face 232. First end portion 231*a* can be joined in any suitable manner to a connector block 233 coupled to a first actuator 236 (e.g., a motor) of any suitable type, for example a pneumatic actuator or a linear pneumatic actuator. First actuator 236 can be configured to move first movable member 231 between its first and second positions. Receptacle 196 can optionally include a limiter 237 of any suitable type for limiting the distance which end face 232 of first movable member 231 can travel within cavity receiving portion 197*a*. For example, connector block 233 can engage an end or limiting surface such as limiter 237 at upper opening 201 of cavity receiving portion 197*a* and thus limit the travel of first movable member 231 relative to funnel 198. First movable member 231 can optionally slide along an internal surface of cavity receiving portion 197*a* as it moves between its first and second positions. End face 232 can approach if not engage lower opening 202 in funnel 198 when in its second position. End face 232 of first movable member 231 can optionally extend at least partially through upper opening 217 in receptacle central portion 206 and into cavity central portion 197*b* when in its second position.

First movable member 231 can be referred to as a compressing or compacting component or member or as a plunger. The movement of first movable member 231 from its first position to its second position causes the pharmaceutical powder disposed in cavity receiving portion 197*a* to move downwardly within funnel 198 towards lower opening 202 and into cavity central portion 197*b* at first end portion 206*a* of receptacle central portion 206. End face 232 of first movable member 231 can optionally have a size and cross-sectional shape that conforms to the size and cross-sectional shape of lower opening 202 in funnel 198 and upper opening

217 in first end portion 206*a* of receptacle central portion 206 so that the pharmaceutical powder within cavity receiving portion 197*a* is pressed into cavity central portion 197*b* by first movable member 231.

Figure 18:
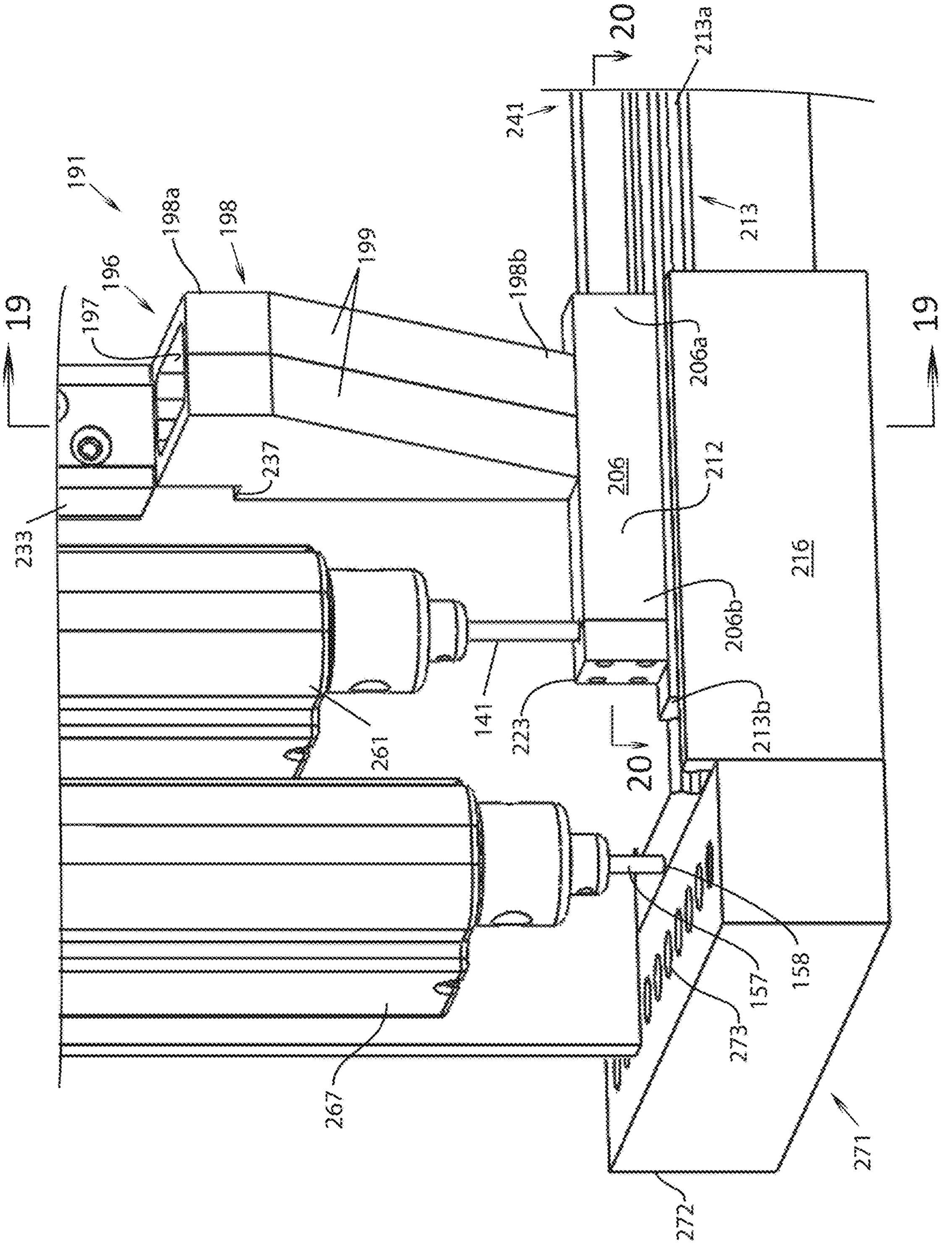
FIG. 18 is an enlarged view of a portion of the device for manufacturing microtablets of FIG. 17.

Machine 191 can optionally include a second movable member 241 which may be slideably or movably carried by support structure 192, for example by receptacle 196, and movable within cavity central portion 197*b* for varying the size and volume of cavity central portion 197*b* (see FIGS. 18 and 20). In this regard, for example, second movable member 241 can be slidable or movable between a first or retracted position, for example as shown in FIG. 20, in which the size of cavity central portion 197*b* is relatively large, and a second or extended or compacting position, not shown, in which the size of cavity central portion 197*b* has decreased in volume and is relatively small. Second movable member 241, including any multiple components forming second movable member 241, can be made from any suitable material such as metal or plastic.

Second movable member 241 optionally includes a first end portion 241*a* and a second end portion 241*b* having an end face 242. First end portion 241*a* can be joined in any suitable manner to a second actuator 243 (e.g., a motor) of any suitable type, for example a pneumatic actuator or a linear pneumatic actuator. Second actuator 243 can be configured to move second movable member 241 between its first and second positions. Receptacle 196 can optionally include a limiter of any suitable type, not shown, for limiting the distance which end face 242 of second movable member 241 can travel within cavity central portion 197*b*. End face 242 can optionally approach if not engage the opening of slot 221 in end block 223 when in its second position. End face 242 of second movable member 241 can optionally extend at least partially through the opening of the slot 221 and cutout 76 to a position extending tangent to a side of internal passageway 74 of elongate member 71.

Second movable member 241 can be referred to as a compressing or compacting component or member or as a plunger. The movement of second movable member 241 from its first position to its second position causes the pharmaceutical powder disposed in cavity central portion 197*b* to move down cavity central portion 197*b* from first end portion 206*a* of receptacle central portion 206 to second end portion 206*b* of the receptacle central portion towards and into cavity end portion 197*c*. End face 242 of second movable member 241 can optionally have a size and cross-sectional shape that conforms to the size and cross-sectional shape of cavity central portion 197*b* so that the pharmaceutical powder in cavity central portion 197*b* cannot readily pass between end face 242 and the walls of receptacle central portion 206 forming cavity central portion 197*b* slideably engaged by end face 242.

End face 242 can be of any suitable configuration, for example planar or arcuate. End face 242 can optionally be planar and perpendicular to the planar side surfaces of second movable member 241. End face 242 can optionally be arcuate, for example, concave. Such a concave end face 242 can optionally have a radius approximately equal to the radius of the internal passageway 74 of elongate member 71.

Machine 191 can optionally include a mold and corresponding recess (each not shown in FIGS. 17-20) for forming the microtablet of the present technology, similar to mold 111 and recess 112 of machine 31 shown in FIG. 8 and FIG. 9. Mold 111 can be referred to as a formation portion and recess 112 can be referred to as a formation area. Machine 191 may optionally include a mold carrier of any suitable size and shape, for example an elongate plate such as slide 213, that is carried by support structure 192. In such configuration, slide 213 may include a first end portion 213*a* and an opposite second end portion 213*b* and include an upper surface 251 and a lower surface 252. Mold 111 can be formed integral with slide 213, for example from the same material as slide 213, or be formed from a different material of slide 213 and secured within slide 213. Mold 111 can optionally extend between upper surface 251 and lower surface 252 of slide 213, and recess 112 can have a first opening at upper surface 251 and a second opening at lower service 252.

Figure 17:
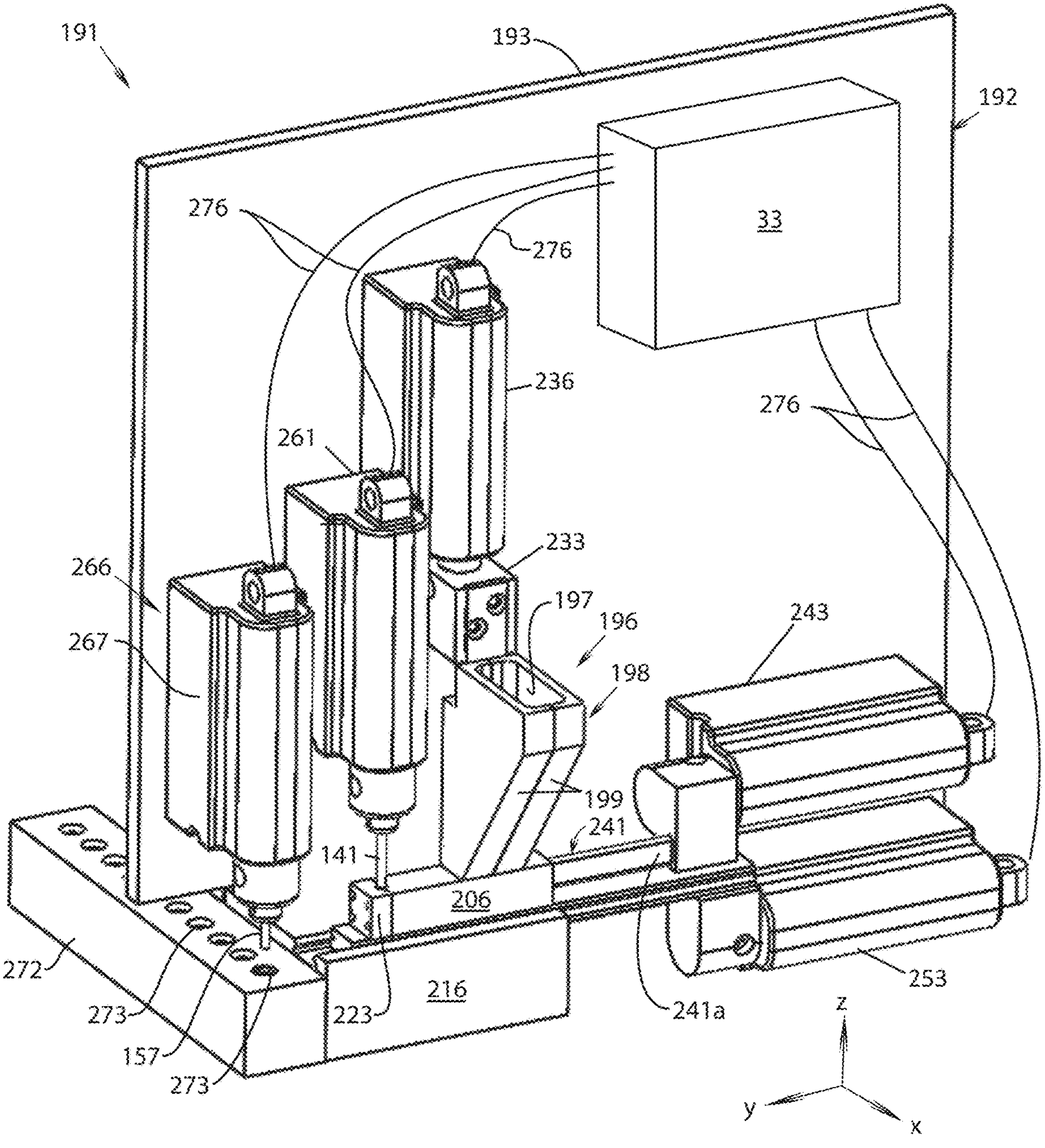
FIG. 17 is a perspective view of another embodiment of a system for manufacturing microtablets of the present technology.

Slide 213 can be movable or slidable with respect to track 214 between a first position, for example as shown in FIGS. 17 and 18, and a second position extending further along the y-axis, not shown. First end portion 213*a* can be joined in any suitable manner to an actuator or motor of any suitable type, for example a pneumatic actuator or a linear pneumatic actuator, such as a slide actuator 253. Slide actuator 253 can be configured to move slide 213 between its first and second positions. When slide 213 is in its first position, which can be referred to as a receiving position, one end of recess 112 of mold 111 is optionally aligned with the open end of internal passageway 74 of receptacle 196 and the other end of recess 112 is sealed, for example by base block 216. When slide 213 is in its second position, which can be referred to as an eject position, recess 112 of mold 111 is optionally accessible at both ends of the recess, for example on both sides of slide 113.

Machine 191 can optionally include a third movable component or member of any suitable type, for example third movable member 141 discussed and illustrated above with respect to machine 31. As discussed above, third movable member 141 can include first end portion 141*a* and opposite second end portion 141*b* having end face 142. End face 142 can be movable within cavity 197, for example cavity end portion 197*c*, for varying the size and optionally the shape of a portion of cavity 197, for example cavity end portion 197*c*. In this regard, for example, third movable member 141 can be slidable or movable between a first or retracted position, for example as shown in FIGS. 17 and 18, in which end face 142 is outside of cavity end portion 197*c*, and a second or compacting position, not shown, in which end face 142 extends at least into cavity end portion 197*c*. Third movable member 141 can optionally be disposed within a first end of internal passageway 74 of elongate member 71 when in its first position. The third movable member can optionally be further disposed within internal passageway 74, for example in the vicinity of the second end of internal passageway 74 or within recess 112, when in its second position.

Third movable member 141, which can be referred to as a compressing or compacting component or member, a plunger, a compactor, a reciprocating member, a repetitive action member, component or compactor or a reciprocating cylindrical member, is optionally retained in position on or within receptacle 196 or by support structure 192 by any suitable means. In this regard, for example, first end portion 141*a* of the third movable member can be joined in any suitable manner to a third actuator 261 (e.g., a motor) of any suitable type, for example a pneumatic actuator or a linear pneumatic actuator. Third actuator 261 can be configured to move third movable member 141, including end face 142 thereof, between its first and second positions. Third actuator 261 can move or reciprocate third movable member 141 between its first and second positions at any suitable speed, rate or frequency. The actuator can optionally control the pressure or force exerted by end face 142 of third movable member 141 on the powder or other material forming the microtablet of the present technology, including the duration of such pressure or force.

Machine 191 can optionally include an ejector 266 for moving the compacted or cylindrical mass formed by machine 191 out of recess 112 of mold 111, for example when slide 213 is in its second position. Ejector 266 can be carried by support structure 192, for example by vertical plate 193, in any suitable manner. Ejector 266 can be of any suitable type, and can optionally include pin 157 having end face 158, each as discussed and illustrated above with respect to machine 31. When slide 213 is in a second position, the first opening of recess 112 is aligned with pin 157 and the second opening of recess 112 is free of any closure surface. Pin 157 can be movable between a first or retracted position, in which end face 158 is outside of recess 112, and a second or extended position, in which end face 158 is at least partially disposed, fully disposed or extending through recess 112 for urging the compacted or cylindrical mass formed by machine 191 out of the recess. Ejector 266 can include a suitable ejector actuator 267 (e.g., a motor) for moving pin 157 between its first and second positions. Ejector actuator 267 can move pin 157 from its first position to its second position at any suitable speed. The actuator can optionally control the pressure or force exerted by end face 158 of the pin 157 on the powder or other material forming the microtablet of the present technology, including the duration of such pressure or force.

Machine 191 can optionally include a collector 271 for receiving microtablets pushed out of mold recess 112 by ejector 266. Collector 271 can be of any suitable type, and can optionally include a receiver such as a tray 272 having multiple compartments 273, each of which can hold one or more microtablets formed by machine 191. Compartments 273 can optionally be spaced apart, for example along a linear or arcuate length of tray 272 or in a grid on tray 272. The tray can optionally be movable, for example manually or by means of any suitable actuator or motor, so as to sequentially register a compartment 273 of tray 272 in the vicinity of the exit opening of recess 112 for receiving one or more microtablets pushed out or ejected from the recess by ejector 266.

Each of the actuators of machine 191, for example first actuator 236, second actuator 243, slide actuator 253, third actuator 261 and ejector actuator 267, can be respectively coupled to controller 33 or any other suitable controller of the present technology by respective one or more lines 276. Such lines can optionally be pneumatic lines or electrical lines for permitting the controller of the present technology to control such actuators.

The device, apparatus or machine of the present technology can have yet other configurations. An apparatus, device or machine such as machine 291, illustrated in FIGS. 21-25, can be included in system 32, which can optionally, additionally include controller 33 or any other suitable controller. Machine 291, which can be referred to as a microtableting machine, can optionally include a support structure 292 having a base that can include vertical plate 293 (see FIG. 21). Support structure 292, including vertical plate 293, can be formed from any suitable material such as metal or plastic.

Machine 291 includes a receptacle 296, provided with a cavity 297, for receiving the pharmaceutical powder or other drug from which a microtablet of the present technology is formed. Some or all of cavity 297 can optionally be called a fill area. Receptacle 296, including the parts thereof, can be formed from any suitable material such as metal or plastic. Receptacle 296 can be of any suitable type, and can optionally include a first or upper portion, which can optionally be in the shape of a funnel, and is referred to herein as a funnel 298. Funnel 298 can be formed from first and second side sections, components or portions 299, which can be joined together by any suitable means. The upstanding or vertical funnel 298, shown as extending substantially along the z axis in FIG. 21, has an upper portion 298*a* and a lower portion 298*b*, and reduces in size and cross-sectional area, or tapers or narrows inwardly, from its upper portion to its lower portion. A cavity receiving portion 297*a* is formed by the funnel, which has an upper opening 301 at the top of upper portion 298*a* for providing the pharmaceutical powder to cavity receiving portion 297*a* and a smaller lower opening 302 at the bottom of lower portion 298*b* of the funnel for permitting the pharmaceutical powder to exit cavity receiving portion 297*a*. Like funnel 288, cavity receiving portion 297*a* reduces in size and cross-sectional area, or tapers or narrows inwardly, from upper opening 301 to lower opening 302. Funnel 288, and cavity receiving portion 297*a*, extend along any suitable arc and through any suitable angle from horizontal upper opening 301 to inclined lower opening 302 (see FIGS. 21-23).

Receptacle 296 optionally includes a receptacle central portion 306 joined to lower portion 298*b* of funnel 298. Receptacle central portion 306 can have a first end portion 306*a* and a second end portion 306*b*. Receptacle central portion 306 can optionally be elongate, extending along any suitable arc through any suitable angle from first end portion 306*a* to second end portion 306*b*. For example, receptacle central portion 306 can extend through such arc in the y-z plane (see FIG. 21). Receptacle central portion 306 has an elongate chamber extending through the arc of receptacle central portion 306 between first end portion 306*a* and second end portion 306*b*, which can be referred to as a cavity central portion 297*b* of cavity 297. Cavity central portion 297*b* is formed from opposite internal surfaces 307, 308 of respective side walls 311, 312 of receptacle central portion 306 that extend substantially parallel to each other (see FIG. 24). Cavity central portion 297*b* can optionally have a rectangular cross-section area, when viewed in section at an angle perpendicular to the arc of cavity central portion 297*b*. Cavity central portion 297*b* can optionally have a constant internal cross-sectional shape and area along its arcuate length. Receptacle central portion 306 is provided with an upper opening 317, for example in first end portion 306*a*, that communicates with lower opening 302 of funnel 298 for permitting material in cavity receiving portion 297*a* formed by the funnel to enter cavity central portion 297*b*.

Cavity 297 can optionally include a cavity end portion 297*c*, at the end of cavity central portion 297*b*, which can optionally be formed at least partially from elongate member 71. Elongate member 71 can have any or all of the configurations, materials and other features discussed above with respect to machine 31. Elongate member 71 can optionally be carried by support structure 292 in any suitable manner, for example within slot 221 extending vertically along surface 222 of end block 223 joined to second end portion 306*b* of receptacle central portion 306 by any suitable means (see FIG. 25). Slot 221, surface 222 and end block 223 can each have any or all of the configurations, materials and other features discussed above with respect to machine 191. Cutout 76 of elongate member 71 can optionally align with the end of cavity central portion 297*b* formed in second end portion 306*b* of receptacle central portion 306. Internal passageway 74 can optionally have a cross-sectional dimension or diameter approximately equal to the width of cavity central portion 297*b*. Cutout 76 and internal passageway 74 can be referred to as cavity end portion 297*c*.

Some or all of the portions of receptacle 296 can optionally be referred to as a variable funnel in that the shape of cavity 297 can change when in use and the volume of cavity 297 can likewise change when in use. For example, the volume of the passageway traveled by the pharmaceutical composition or powder from the entrance of cavity 297, that is the entrance of cavity receiving portion 297*a*, to internal passageway 74 within elongate member 71 at cavity end portion 297*c*, decreases in volume along the course of such travel. Some or all of the portions of cavity 297 can be referred to as a volume reduction area. Some or all of the portions of receptacle 296 can be referred to as a volume reduction chamber, a compaction chamber, a powder compressing chamber or any combination of the foregoing.

Figure 21:
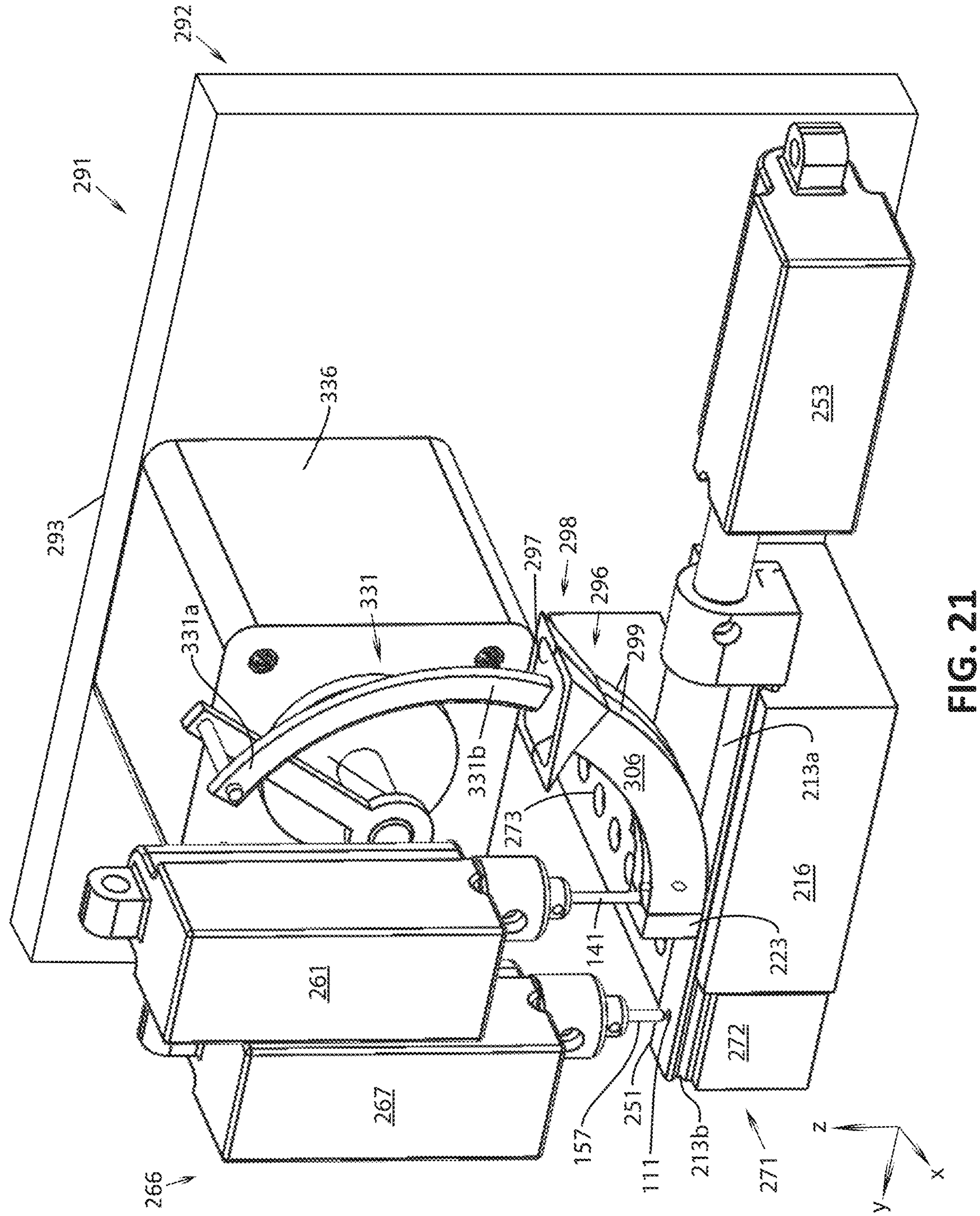
FIG. 21 is a perspective view of another embodiment of a system for manufacturing microtablets of the present technology.
Figure 22:
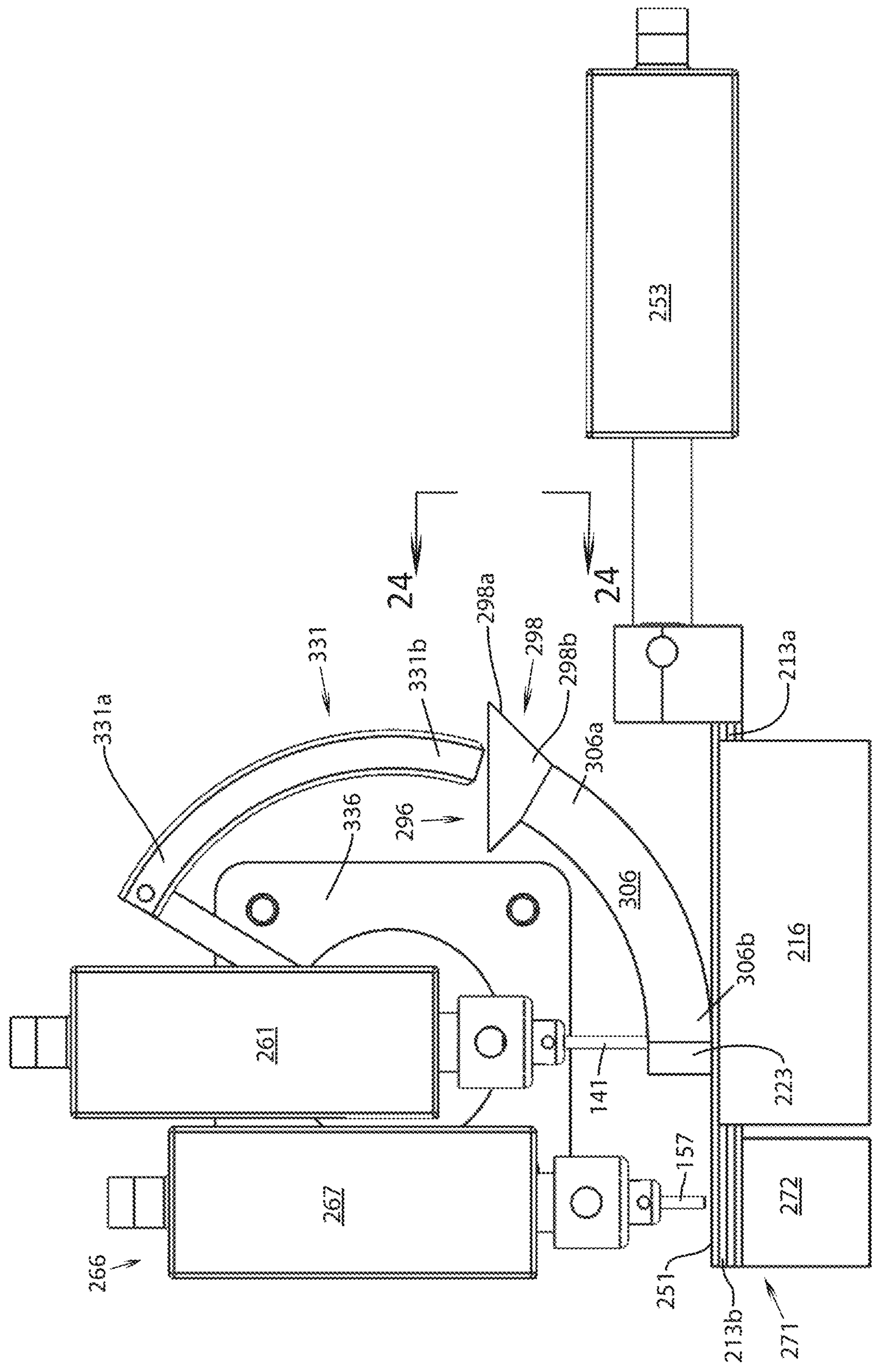
FIG. 22 is a side elevation view of the device for manufacturing microtablets of FIG. 21.
Figure 23:
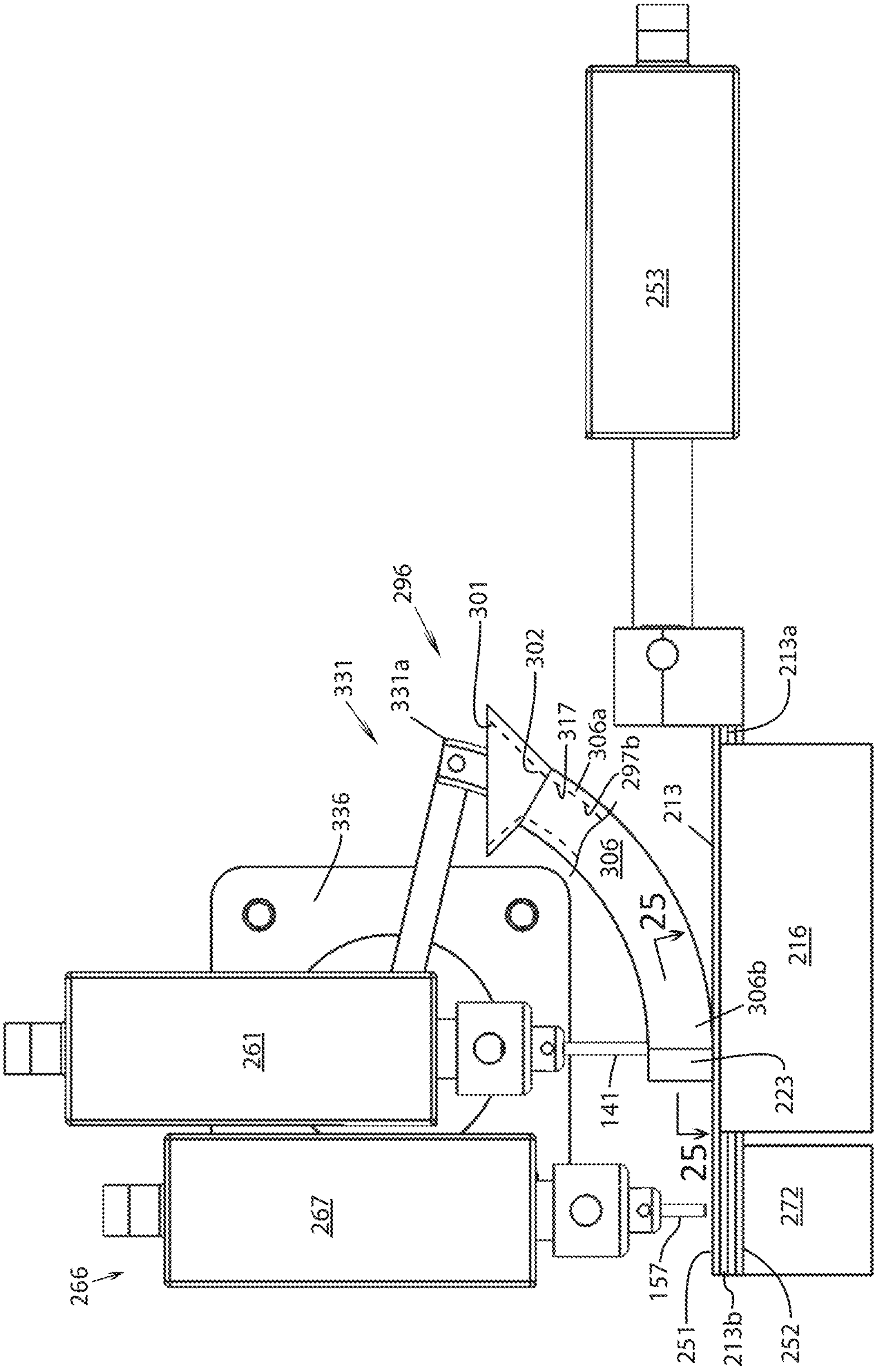
FIG. 23 is a side elevation view of the device for manufacturing microtablets of FIG. 21 in a second position.
Figure 25:
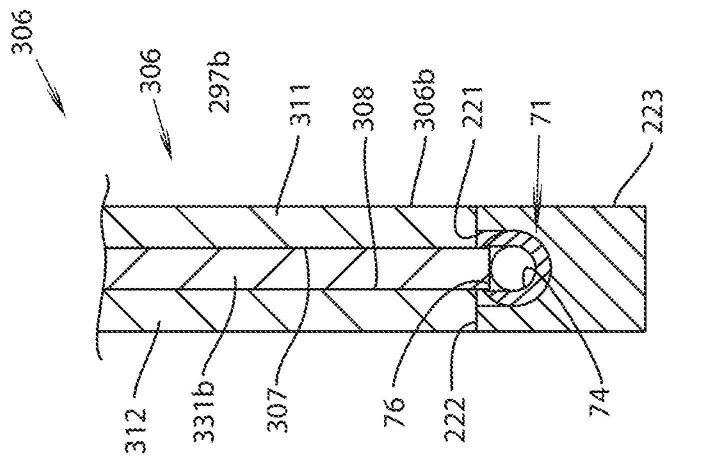
FIG. 25 is a cross-sectional view of the device for manufacturing microtablets of FIG. 21 taken along the line 25-25 of FIG. 23.
Figure 24:
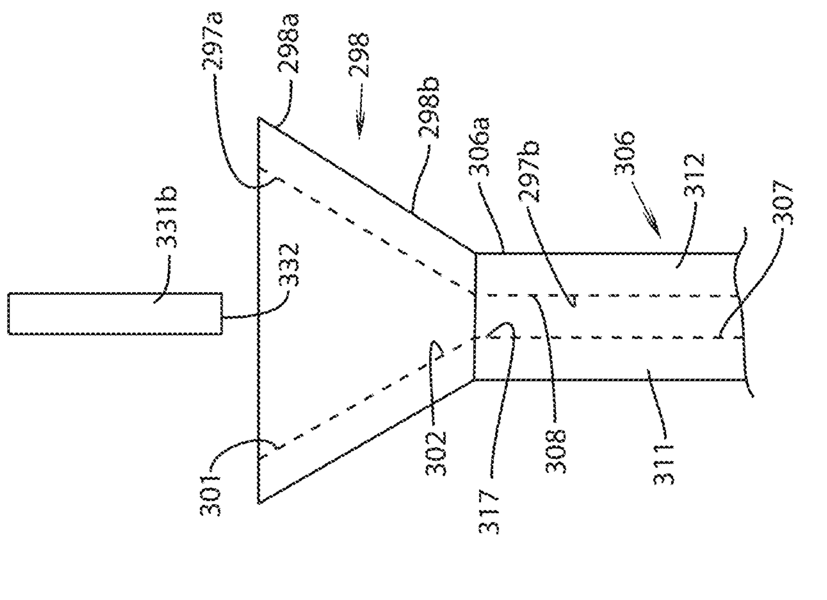
FIG. 24 is a side elevational view of the device for manufacturing microtablets of FIG. 21 taken along the line 24-24 of FIG. 22.

Machine 291 can optionally include at least one movable component or member, which can optionally include a first movable member 331 slideably or movably carried by support structure 392, for example by receptacle 296, and movable within cavity receiving portion 297*a* for varying the size and volume of cavity receiving portion 297*a*. In this regard, for example, first movable member 331 can be slidable or movable between a first or retracted position, for example as shown in FIGS. 21-22 and 24, in which the size of cavity receiving portion 297*a* is relatively large, and a second or extended or compacting position extending at least partially into cavity receiving portion 297*a*, in which the size of cavity receiving portion 297*a* has decreased in volume and is relatively small. First movable member 331 can, optionally and additionally, be movable within cavity central portion 297*b* for varying the size and volume of cavity central portion 297*b*. In this regard, for example, first movable member 331 can be slidable or movable between a third or retracted position outside of cavity central portion 297*b*, in which the size of cavity central portion 297*b* is relatively large, and a fourth or extended or compacting position, for example as shown in FIGS. 23 and 25, in which the size of cavity central portion 297*b* has decreased in volume and is relatively small.

First movable member 331 can be of any suitable shape and size, and can optionally have a size and shape corresponding to cavity central portion 297*b*, cavity receiving portion 297*a* or both. For example, first movable member 331 can optionally have an arcuate shape in the y-z plane corresponding to the arc of cavity central portion 297*b*, the arc of cavity receiving portion 297*a* or both. First movable member 331 can optionally be planar in the x-z plane. First movable member 331, including any multiple components thereof, can be made from any suitable material such as metal or plastic.

First movable member 331 optionally includes a first end portion 331*a* and an opposite second end portion 331*b* having an end face 332. First end portion 331*a* can be joined in any suitable manner to an actuator 336 (e.g., a motor) of any suitable type, for example a pneumatic actuator or a rotary pneumatic actuator. Actuator 336, which can be carried by support structure 292 for example secured to vertical plate 293, can be configured to move first movable member 331 between its first and second positions and between its third and fourth positions. Receptacle 296 can optionally include one or more limiters of any suitable type, not shown, for limiting the distance which end face 332 of the first movable member can travel within cavity receiving portion 297*a*, cavity central portion 297*b* or both.

First movable member 331 can be referred to as a compressing or compacting component or member or as a plunger. The movement of first movable member 331 from its first position to its second position causes the pharmaceutical powder disposed in cavity receiving portion 297*a* to move downwardly within funnel 298 towards lower opening 302 and into cavity central portion 297*b* at first end portion 306*a* of receptacle central portion 306. End face 332 of first movable member 331 can optionally have a size and cross-sectional shape that conforms to the size and cross-sectional shape of lower opening 302 in funnel 298 and entrance or upper opening 317 in first end portion 306*a* of receptacle central portion 306 so that the pharmaceutical powder within cavity receiving portion 297*a* is pressed into cavity central portion 297*b* by first movable member 331.

The movement of first movable member 331 from its third position to its fourth position causes the pharmaceutical powder disposed in cavity central portion 297*b* to move down cavity central portion 297*b* from first end portion 306*a* of receptacle central portion 306 to second end portion 306*b* of receptacle central portion 306 towards and into cavity end portion 297*c*. End face 332 of first movable member 331 can optionally have a size and cross-sectional shape that conforms to the size and cross-sectional shape of cavity central portion 297*b* so that the pharmaceutical powder in cavity central portion 297*b* cannot readily pass between end face 332 and the walls of receptacle central portion 306 forming cavity central portion 297*b* slideably engaged by end face 332.

End face 332 can be of any suitable configuration, for example planar or arcuate. End face 332 can optionally be planar and perpendicular to the planar side surfaces of first movable member 331 and planar and perpendicular to the arc of the first movable member. End face 332 can optionally be arcuate, for example, concave between the planar side surfaces of first movable member 331. Such a concave end face 332 can optionally have a radius approximately equal to the radius of the internal passageway 74 of elongate member 71.

Machine 291 can optionally include mold 111 having recess 112 for forming the microtablet of the present technology. Mold 111 can be referred to as a formation portion and recess 112 can be referred to as a formation area. Mold 111, shown in FIG. 21, and recess 112, not shown with respect to machine 291, can each optionally be as discussed and illustrated above with respect to machine 31. Machine 291 can optionally include a mold carrier carried by support structure 292. The mold carrier can be of any suitable size and shape, for example an elongate plate such as slide 213, discussed and illustrated above with respect to machine 191. Slide 213 can be movable or slidable with respect to track 214 between a first position, for example as shown in FIGS. 17 and 18 with respect to machine 191, and a second position extending further along the y-axis, for example as shown in FIGS. 21-23 with respect to machine 291. First end portion 213*a* can be joined in any suitable manner to an actuator or motor of any suitable type, for example, slide actuator 253 which can be configured to move slide 213 between its first and second positions. When slide 213 is in its first position, which can be referred to as a receiving position, one end of recess 112 of mold 111 is optionally aligned with the open end of internal passageway 74 of receptacle 196 and the other end of recess 112 is sealed, for example by base block 216. When slide 213 is in its second position, which can be referred to as an eject position, recess 112 of mold 111 is optionally accessible at both ends of the recess, for example on both sides of slide 213.

Machine 291 can optionally include an additional movable component or member of any suitable type, for example third movable member 141 discussed and illustrated above with respect to machines 31 and 191. Third movable member 141, including end face 142 thereof can optionally be movable and operable in the manner discussed above. Third movable member 141, which can be referred to as a compressing or compacting component or member, a plunger, a compactor, a reciprocating member, a repetitive action member, component or compactor or a reciprocating cylindrical member. First end portion 141*a* of the third movable member can be joined in any suitable manner to a third actuator or motor of any suitable type, for example third actuator 261, which can optionally be movable and operable in the manner discussed above.

Machine 291 can optionally include ejector 266, which can optionally include pin 157 having end face 158 and ejector actuator 267, each as discussed and illustrated above with respect to machine 191. Ejector 266 can optionally be movable and operable in the manner discussed above.

Machine 291 can optionally include collector 271 for receiving microtablets pushed out of recess 112 by ejector 266, as discussed above with respect to machine 191. Collector 271 can optionally be movable and operable in the manner discussed above.

Each of the actuators of machine 291, for example actuator 336, slide actuator 253, third actuator 261 and ejector actuator 267, can be respectively coupled to controller 33 or any other suitable controller of the present technology, not shown, by respective one or more lines, not shown. Such lines can optionally be pneumatic lines or electrical lines for permitting the controller of the present technology to control such actuators.

A method for manufacturing a compressed mass, which can be a microtablet of a pharmaceutical composition or medicament, is provided. The compressed mass can be referred to as a cylindrical mass. The microtablet can be for ingestion or other consumption by a mammal, for example a human. The pharmaceutical composition or medicament for forming a compressed mass may optionally be in the form of a pharmaceutical powder.

The method can include compressing, compacting or pushing the powder to form a compressed mass of a density. In this regard, for example, an amount of the pharmaceutical powder at least sufficient to form a single compressed mass can optionally be disposed or placed within or provided into a cavity or chamber, for example fill area or cavity 47 of the receptacle 46, cavity 197 of receptacle 196 or fill area or cavity 297 of receptacle 296, for compression or otherwise. Other amounts of the pharmaceutical powder can optionally be placed in cavity 297, for example an amount of the pharmaceutical powder at least sufficient to form multiple compressed masses, or microtablets.

The compressing can optionally include compressing, compacting or pushing the pharmaceutical powder in at least one direction, for example a first direction, or in multiple directions, including for example first and second directions. The first and second directions can optionally be orthogonal to each other, or at any other angle with respect to each other. The compressed pharmaceutical powder can optionally be referred to as a compacted mass, for example a compacted mass of the density.

The compressing can optionally include compressing, compacting or pushing the powder in at least one direction with the use of at least one movable member, for example at least one movable compressing or compacting member. The compressing can optionally include compressing, compacting or pushing the powder in a first direction to form a collected mass of powder and compressing or compacting the collected mass of powder in a second direction, for example in receptacle 46. The compressing, compacting or pushing of the powder in the second direction can occur subsequently to, simultaneously with or in an overlapping manner with the compressing, compacting or pushing of the powder in the first direction.

The compressing can optionally include pushing the powder into a recess, mold or other formation area for forming the microtablet. The powder can be compressed, compacted or tamped in the formation area to increase the density and reduce the volume of the powder. The formed microtablet can be pushed out from, ejected or otherwise removed from the formation area.

With respect to machine 31, the compressing, compacting or pushing can include compressing the powder within cavity 47, for example cavity receiving portion 47*a*, with first movable member 81 in a first direction, such as along the y axis identified in FIG. 3. For example, first movable member 81 can be moved from its first position to its second position within cavity 47 so that end face 82 of first movable member 81 urges and thus compresses, compacts or otherwise concentrates or directs the pharmaceutical powder to form a collected mass of powder within cavity receiving portion 47*a* against internal end surface 62. The directing, compressing or compacting by first movable member 81 can merely serve to collect the powder to a particular region in cavity 47 or optionally serve to increase the density of the pharmaceutical powder, i.e. to have a first density, within cavity 47. The compressing can optionally include compressing the powder within the reduced cavity receiving portion 47*a* with second movable member 91 in a second direction, such as along the z axis identified in FIG. 3. For example, second movable member 91 can be moved from its first position to a second position within cavity receiving portion 47*a* so that end face 92 of second movable member 91 urges and thus compresses, compacts or otherwise concentrates or directs the pharmaceutical powder within cavity receiving portion 47*a* into at least cavity central portion 47*b* and optionally into cavity central portion 47*b* and cavity lower portion 47*c* (see FIG. 13). The compressing or compacting by second movable member 91 can optionally serve to further increase the density of the pharmaceutical powder, i.e. to have a second density greater than the first density, within cavity 47. The second direction movement of second movable member 91 can optionally be orthogonal to the first direction movement of first movable member 81, and is illustrated in the figures as being orthogonal. The compacted mass formed by the at least one movable compressing or compacting member, for example by first movable member 81, second movable member 91 or both, can be referred to as a cylindrical mass or a compact cylindrical mass. For example, the compacted mass formed by second movable member 91 within cavity central portion 47*b*, or cavity central portion 47*b* and cavity lower portion 47*c*, can be referred to as a cylindrical mass or compact cylindrical mass extending along a longitudinal axis, for example the longitudinal axis of cavity central portion 47*b* or cavity lower portion 47*c*.

In various embodiments, the method of the present technology can optionally include additionally compressing or compacting the compressed mass to increase the density the compressed mass. For example, the compressed mass may be pushed out of cavity 47 into recess 112 for further compression or compaction. Such a compressing or compacting can optionally include repeatedly compacting the compressed mass. The compacting can optionally include repeatedly compacting the compressed mass, for example a compressed cylindrical mass, along the longitudinal axis of the mass. The compacting can optionally include repeatedly compacting the compressed mass in an additional direction that is orthogonal to the first and second compressing directions of the compressing. The additionally compacting the compressed mass can occur subsequently to, simultaneously with or in an overlapping manner with the compressing or compacting of the powder in the first direction, the compressing or compacting the powder in the second direction or both.

The compacting can optionally include repeatedly or repetitively compacting the compressed mass with a third movable member, which can be referred to as a compacting member, a reciprocating compacting member or a repetitive action member. The third movable member can optionally be third movable member 141, which can be referred to as a compacting member, a reciprocating member, a reciprocating compacting member or a repetitive action member. Third movable member 141 can move from its first position to its second position along a longitudinal axis, for example the longitudinal axis of internal passageway 74 of elongate member 71 or of recess 112, in a third direction, such as along the x axis identified in FIG. 3. Movement of the third movable member 141 from its first position to it second position can optionally cause end face 142 of third movable member 141 to press, place or push the packed pharmaceutical powder within cavity lower portion 47*c*, for example within internal passageway 74 of elongate member 71, into recess 112 of mold 111 and repeatedly compress, compact or tamp the powder within recess 112. Such repeated movement, compacting or compressing of the compressed mass can optionally be alongside first movable member 81 and second movable member 91, for example alongside end face 82 of the first movable member and end face 92 of the second movable member. The compressing or compacting by third movable member 141 can optionally serve to further increase the density of the pharmaceutical powder, i.e. to have a third density greater than the second density, within cavity 47. With each successive reciprocation of movable member 141, the density of the powder incrementally increases to generate a compacted solid mass at a final density and shape to form the microtablet in accordance with the present technology. The third direction of travel of third movable member 141 can optionally be orthogonal to one or both of the direction of travel of first movable member 81 and the direction of travel of second movable member 91.

Third movable member 141 can optionally compress, compact or tamp some or all of the pharmaceutical powder within cavity lower portion 47*c*, for example within internal passageway 74, into recess 112 of mold 111 carried by slide 113. In this regard, for example, the second end of recess 112 abuts block 117 so as to seal the second end of the recess while the pharmaceutical powder is being packed, pressed, placed, disposed or received into the recess by third movable member 141. The compacting can optionally include pressing or placing the pharmaceutical powder in cavity lower portion 47*c* into recess 112 and thereafter compacting or compressing the powder in the recess, for example repeatedly compressing or compacting the powder in the recess. Recess 112 can optionally be a cylindrical recess. Slide 113 can be retained in its first position while being loaded with the pharmaceutical powder by the engagement of first magnet 121 of the slide with third magnet 123 of first stop 126, as well as by locking mechanism 131.

Third movable member 141 can optionally reciprocate, for example under the control of controller 33 or any other controller of the present technology, so as to repeatedly or repetitively compact or compress the pharmaceutical powder within recess 112, and optionally within cavity lower portion 47*c* or internal passageway 74, along the longitudinal axis of recess 112, internal passageway 74 and the cylindrical mass. Controller 33 can include features for controlling various parameters relating to the actions and movements of third movable member 141. For example, suitable knobs, levers, buttons or other hand-actuatable components can be provided for controlling the pressure imparted by third movable member 141 on the compressed mass, the duration of time during which third movable member 141 reciprocates, how quickly the third movable member reciprocates, or any combination of the foregoing. In this regard, controller 33 can optionally include a knob 170 for controlling the amount of pressure exerted by third movable member 141 on the compressed mass, a gauge 171 indicating such pressure, a first timer 172 dictating the total time that third movable member 141 compresses the pharmaceutical powder and a second timer 173 dictating how quickly, for example the frequency, the third movable member 141 is reciprocating in and out of recess 112. The pressure exerted by third movable member 141 on the compressed mass can be in any suitable amount or range, and can optionally range from zero to 80 pounds per square inch.

The compressing of the pharmaceutical powder in recess 112 can optionally serve to form a micro tablet having a perimeter conforming to an inner surface of recess 112. Once recess 112 of mold 111 has been packed with the desired amount of the pharmaceutical powder, locking mechanism 131 can be unlocked to permit slide 113 to be moved in track 116 from its first position to its second position. Slide 113 can be retained in its second position by the engagement of second magnet 122 at the second end of slide 113 with fourth magnet 127 of second stop 128, as well as by engagement or activation of the locking mechanism 131. When slide 113 is in its second position, formation portion or mold 111 can optionally have been moved or extended away from the remaining portion of machine 31 and recess 112 is aligned or registered with pin 157 of ejector 156 (see FIG. 15). Ejector 156 can optionally then be actuated, for example under the control of controller 33 or any other controller of the present technology, to cause pin 157 of the ejector to move from its first position to its second position. Such movement of pin 157 causes end face 158 of the pin to engage the compressed mass or microtablet within recess 112, for example at the first end of the recess at the first end of formation portion or mold 111, and urge or push the compressed mass or microtablet out of the recess, for example out of the opposite second end of the recess at the second end of the formation portion or mold. The compressed or shaped mass or microtablet can be collected at the second end of the formation portion or mold 111 by any suitable means.

With respect to machine 191, the compressing, compacting or pushing can include compressing the powder within cavity 197, for example cavity receiving portion 197*a*, with first movable member 231 in a first direction, such as along the z axis identified in FIG. 17. For example, first movable member 231 can be moved from its first position to its second position within cavity 197, for example by first actuator 236 under the control of controller 33, so that end face 232 of first movable member 231 urges and thus compresses or compacts the pharmaceutical powder downwardly within cavity receiving portion 197*a* through lower opening 202 in cavity receiving portion 197*a* and upper opening 217 in cavity central portion 197*b* into first end portion 206*a* of receptacle central portion 206. The compressing can optionally include compressing the pharmaceutical powder within first end portion 206*a* of receptacle central portion 206. The compressing or compacting by first movable member 231 can optionally serve to increase the density of the pharmaceutical powder within cavity 197.

The compressing can optionally include compressing the powder within cavity central portion 197*b* with second movable member 241 in a second direction, such as along the y axis identified in FIG. 17. For example, second movable member 241 can be moved from its first position to a second position within cavity central portion 197*b*, for example by second actuator 243 under the control of controller 33, so that end face 242 of the second movable member 241 urges and moves and thus compresses or compacts the pharmaceutical powder within cavity central portion 197*b* and optionally into cavity end portion 197*c*. The compressing or compacting by second movable member 241 can optionally serve to further increase the density of the pharmaceutical powder within cavity 197. The second direction movement of second movable member 241 can optionally be orthogonal to the first direction movement of first movable member 231, and is illustrated in the figures as being orthogonal. The compacted mass formed by the at least one movable compressing or compacting member, for example by first movable member 231, second movable member 241 or both, can be referred to as a cylindrical mass or a compact cylindrical mass. For example, the compacted mass formed by second movable member 241 within cavity end portion 197*c*, can be referred to as a cylindrical mass or compact cylindrical mass extending along a longitudinal axis, for example the longitudinal axis of cavity end portion 197*c*.

The method of the present technology can optionally include additionally compressing or compacting the compressed mass to increase the density the compressed mass. For example, the compressed mass may be pushed out of cavity 197 into recess 112 within slide 213 for further compression or compaction. Such a compressing or compacting can optionally include repeatedly compacting the compressed mass. The compacting can optionally include repeatedly compacting the compressed mass, for example a compressed cylindrical mass, along the longitudinal axis of the mass. The compacting can optionally include repeatedly compacting the compressed mass in an additional direction that is orthogonal to the first and second compressing directions of the compressing. The additionally compacting the compressed mass can occur subsequently to, simultaneously with or in an overlapping manner with the compressing or compacting of the powder in the first direction, the compressing or compacting the powder in the second direction or both.

The compacting can optionally include repeatedly or repetitively compacting the compressed mass with a third movable member, which can be referred to as a compacting member, a reciprocating compacting member or a repetitive action member. The third movable member can optionally be third movable member 141 discussed above, which can be referred to as a compacting member, a reciprocating member, a reciprocating compacting member or a repetitive action member. Third movable member 141 can move from its first position to its second position along a longitudinal axis, for example the longitudinal axis of the internal passageway 74 of elongate member 71 or of recess 112, in a third direction, such as along the z axis identified in FIG. 17. Third moveable member 141 can be movable by third actuator 261 under the control of controller 33. Movement of the third movable member from its first position to it second position can optionally cause end face 142 of third movable member 141 to press, place or push the packed pharmaceutical powder within cavity end portion 197*c*, for example within internal passageway 74 of elongate member 71, into recess 112 of mold 111 within slide 213 and repeatedly compress, compact or tamp the powder within recess 112. The compressing or compacting by third movable member 141 can optionally serve to further increase the density of the pharmaceutical powder within cavity 197. The third direction of travel of third movable member 141 can optionally be orthogonal to one or both of the direction of travel of first movable member 231 and the direction of travel of second movable member 241. For example, the direction of travel of third movable member 141 can be orthogonal to the direction of travel of second movable member 241 but substantially parallel to the direction of travel of first movable member 231.

Third movable member 141 can optionally compress, compact or tamp some or all of the pharmaceutical powder within cavity end portion 197*c*, for example within internal passageway 74, into recess 112 of mold 111 carried by slide 213. In this regard, for example, the second end of recess 112 can abut base block 216 so as to seal the second end of the recess while the pharmaceutical powder is being packed, pressed, placed, disposed or received into the recess by third movable member 141. The compacting can optionally include pressing or placing the pharmaceutical powder in cavity end portion 197*c* into recess 112 and thereafter compacting or compressing the powder in the recess, for example by repeatedly compressing or compacting the powder in the recess, such that with each successive reciprocation of movable member 141, the density of the powder incrementally increases to generate a compacted solid mass at a final density and shape to form the microtablet in accordance with the present technology. Recess 112 can optionally be a cylindrical recess. Slide 213 can optionally be retained in its first position while being loaded with the pharmaceutical powder by second actuator 243 under the control of controller 33.

Third movable member 141 can optionally reciprocate, for example under the control of controller 33 or any other controller of the present technology, so as to repeatedly or repetitively compact or compress the pharmaceutical powder within recess 112, and optionally within cavity end portion 197*c* or internal passageway 74, along the longitudinal axis of recess 112, internal passageway 74 and the cylindrical mass. As discussed above, controller 33 can include features for controlling various parameters relating to the actions and movements of third movable member 141 and can optionally operate in the manner discussed above.

The compressing of the pharmaceutical powder in recess 112 can optionally serve to form a micro tablet having a perimeter conforming to an inner surface of recess 112. Once recess 112 of mold 111 has been packed with the desired amount of the pharmaceutical powder, slide 213 to be moved in track 214 by slide actuator 253 from its first position to its second position so that second end portion 213*b* of the slide is aligned or registered with pin 157 of ejector 266. When slide 213 has moved to its second position, formation portion or mold 111 can optionally have been moved or extended away from the remaining portion of machine 191 for registering pin 157 with ejector 266. Ejector 156 can optionally then be actuated, for example by ejector actuator 267 under the control of controller 33, to cause pin 157 of the ejector to move from its first position to its second position. Such movement of pin 157 causes end face 158 of the pin to engage the compressed mass or microtablet within recess 112, for example at the first end of the recess at the first end of the formation portion or mold 111, and urge or push the compressed mass or microtablet out of the recess, for example out of the opposite second end of the recess at the second end of the formation portion or mold. The compressed or shaped mass or microtablet can be collected at the second end of the formation portion or mold by any suitable means, for example into a desired compartment 273 of collector 271.

With respect to machine 291, the compressing, compacting or pushing can include compressing the powder within cavity 297, for example cavity receiving portion 297*a*, with first movable member 331 in a first direction, for example in a rotary motion about an axis extending along the x axis identified in FIG. 21. For example, first movable member 331 can be moved from its first position to its second position within cavity 297, for example by rotary actuator 336 under the control of controller 33, so that end face 332 of first movable member 331 urges and thus compresses, compacts, concentrates or otherwise directs the pharmaceutical powder downwardly within cavity receiving portion 297*a* through lower inclined opening 302 in cavity receiving portion 297*a* and inclined upper opening 317 in cavity central portion 297*b* into first end portion 306*a* of receptacle central portion 306. The compressing can optionally include compressing the pharmaceutical powder within first end portion 306*a* of receptacle central portion 306. The compressing or compacting by first movable member 331 can optionally serve to increase the density of the pharmaceutical powder within cavity 297 from a first density to a second density.

The compressing can optionally include compressing the powder within cavity central portion 297*b* with first movable member 331 in the first direction, for example in the same rotary motion in the y-z plane about an axis extending along the x axis identified in FIG. 21. For example, first movable member 331 can be moved from its third position to its fourth position within cavity central portion 297*b*, for example by actuator 336 under the control of controller 33 (not shown in FIG. 21), so that end face 332 of first movable member 331 urges and moves and thus compresses or compacts the pharmaceutical powder within cavity central portion 297*b* and optionally into cavity end portion 297*c*. The compressing or compacting by first movable member 331 in cavity central portion 297*b* can optionally serve to further increase the density of the pharmaceutical powder within cavity 297. The direction of movement of first movable member 331 in cavity central portion 297*b* is the same direction of movement of the first movable member in cavity receiving portion 297*a*. The compacted mass formed by the at least one movable compressing or compacting member, for example by first movable member 331, can be referred to as a cylindrical mass or a compact cylindrical mass. For example, the compacted mass formed by first movable member 331 within cavity end portion 297*c*, can be referred to as a cylindrical mass or compact cylindrical mass extending along a longitudinal axis, for example the longitudinal axis of cavity end portion 297*c*.

The method of the present technology can optionally include additionally compressing or compacting the compressed mass to increase the density the compressed mass. For example, the compressed mass may be pushed out of cavity 297 into recess 112 within slide 213 for further compression or compaction. Such a compressing or compacting can optionally include repeatedly compacting the compressed mass. The compacting can optionally include repeatedly compacting the compressed mass, for example a compressed cylindrical mass along the longitudinal axis of the mass by repeatedly compressing or compacting the powder in the recess such that with each successive reciprocation of movable member 141, the density of the powder incrementally increases to generate a compacted solid mass at a final density and shape to form the microtablet in accordance with the present technology. The compacting can optionally include repeatedly compacting the compressed mass in an additional direction that is orthogonal to the first compressing direction of the compressing. The additionally compacting the compressed mass can occur subsequently to, simultaneously with or in an overlapping manner with the compressing or compacting of the powder in the first direction.

The compacting can optionally include repeatedly or repetitively compacting the compressed mass with an additional movable member, which can be referred to as a compacting member, a reciprocating compacting member or a repetitive action member. The additional movable member can optionally be third movable member 141 discussed above, which can be referred to as a compacting member, a reciprocating member, a reciprocating compacting member or a repetitive action member. Third movable member 141, for example movable by third actuator 261 under the control of controller 33, can optionally be movable and operable in the same manner discussed above with respect to machine 191. For example, movement of the third movable member from its first position to it second position can optionally cause end face 142 of third movable member 141 to press, place or push the packed pharmaceutical powder within cavity end portion 297*c*, for example within internal passageway 74 of elongate member 71, into recess 112 of mold 111 within slide 213 and repeatedly compress, compact or tamp the powder within recess 112, as discussed above. The direction of travel of third movable member 141 can optionally be orthogonal to the direction of travel of first movable member 331.

Third movable member 141 can optionally compress, compact or tamp some or all of the pharmaceutical powder within cavity end portion 297*c*, for example within internal passageway 74, into recess 112 of mold 111 carried by slide 213. Such action and interaction of third movable member 141, recess 112, mold 111 and slide 213 can optionally be the same as discussed above with respect to machine 191.

Third movable member 141 can optionally reciprocate, for example under the control of controller 33 or any other controller of the present technology, so as to repeatedly or repetitively compact or compress the pharmaceutical powder within recess 112, and optionally within cavity end portion 297*c* or internal passageway 74, along the longitudinal axis of recess 112, internal passageway 74 and the cylindrical mass. As discussed above, controller 33 can include features for controlling various parameters relating to the actions and movements of third movable member 141 and can optionally operate in the manner discussed above.

The compressing of the pharmaceutical powder in recess 112 can optionally serve to form a micro tablet having a perimeter conforming to an inner surface of recess 112. Once recess 112 of mold 111 has been packed with the desired amount of the pharmaceutical powder, slide 213 to be moved in track 214 by slide actuator 253 from its first position to its second position so that second end portion 213*b* of slide 213 is aligned or registered with pin 157 of ejector 266. When slide 213 has moved to its second position, formation portion or mold 111 can optionally have been moved or extended away from the remaining portion of machine 291 for registering pin 157 with ejector 266. Ejector 156 can optionally then be actuated, for example by ejector actuator 267 under the control of controller 33, to cause pin 157 of the ejector to move from its first position to its second position. Such movement of pin 157 causes end face 158 of the pin to engage the compressed mass or microtablet within recess 112, for example at the first end of the recess at the first end of the formation portion or mold 111, and urge or push the compressed mass or microtablet out of the recess, for example out of the opposite second end of the recess at the second end of the formation portion or mold. The compressed or shaped mass or microtablet can be collected at the second end of the formation portion or mold by any suitable means, for example into a desired compartment 273 of collector 271.

In various embodiments, methods of the present technology can include automating the actions of first movable member of the present technology, the second movable member of the present technology, the third movable member of the present technology or any combination the foregoing. The method of the present technology can optionally additionally include automating the placement of the pharmaceutical powder into fill area or cavity of the present technology. The placement of the pharmaceutical powder into the fill area or cavity and the pushing of the pharmaceutical powder from the fill area or cavity into the formation area of the present technology can optionally be automated and can optionally be a repetitive action. Controller 33 or any other controller of the present technology can optionally be configured to engage in such repetitive action when the cavity contains a predetermined amount of the pharmaceutical powder.

Embodiments of the microtablet of the present technology can be of any suitable size or volume. The microtablet can optionally have a volume in the range of 1.3 to 1.5 cubic millimeters. The microtablet can optionally have a volume of approximate three cubic millimeters.

It should be appreciated that the apparatus and method of the present technology can be configured to produce more than one microtablet in each cycle. For example, the compressed mass formed in one cycle of the method and apparatus of the present technology can be sliced or cut into more than one microtablet for ingestion or other consumption by a human or other mammal. For example, the length of recess 112 can be sized so that the compressed mass produced therein can be cut along its length to provide multiple microtablets.

Embodiments of the machine and method of the present technology avoid using large forces to create embodiments of microtablets for delivery to a human or other mammal by oral, injection or other method known in the drug delivery art. Instead, the machine and method of the present technology advantageously uses small, low or minimal forces, for example in a sequential manner, which can include application in multiple directions, to gradually compress and compact a pharmaceutical powder or other substance so as to create a microtablet. Such small, low or minimal forces inhibit or reduce damage to the pharmaceutical powder or other substance during the fabrication process, for example by inhibiting the breakage of bonds in large drug molecules that can reduce or eliminate the bioactivity and thus the effectiveness of such molecules or change the formulation of the drug. In use, such embodiments allow for fabrication of microtablets comprising a pharmaceutical agent with minimal loss of the bioactivity of the pharmaceutical agent.

From the description herein, it will be appreciated that the present disclosure encompasses multiple embodiments which include, but are not limited to, the following:

1. A machine for manufacturing a microtablet from a pharmaceutical powder for ingestion by a human, the machine comprising: a support structure having a receptacle for receiving the powder; a first movable member carried by the support structure for directing the powder in the receptacle in a first direction; and a second movable member carried by the support structure for compacting the powder in the receptacle in a second direction to form a compact mass of the drug.

2. The method or apparatus of any of the preceding or subsequent embodiments, wherein the compact mass is a compact cylindrical mass extending along a longitudinal axis, the machine further comprising: a third movable member carried by the support structure for successively compacting the compact cylindrical mass along the longitudinal axis.

3. The method or apparatus of any of the preceding or subsequent embodiments, further comprising a mold having a recess in the form of the microtablet for receiving the compact cylindrical mass under the force of the third movable member.

4. The method or apparatus of any of the preceding or subsequent embodiments, further comprising a cylindrical pin movable from a first position outside of the recess to a second position within the recess for ejecting the microtablet from the recess.

5. The method or apparatus of any of the preceding or subsequent embodiments, wherein the first movable member has a face for engaging the powder so as to direct the powder and the second movable member travels between first and second positions along the face of the first movable member for compacting the powder.

6. The method or apparatus of any of the preceding or subsequent embodiments, wherein the second movable member comprises a reciprocating member configured for successively compacting the powder in the second direction.

7. The method or apparatus of any of the preceding or subsequent embodiments, wherein the second direction is orthogonal to the first direction, and wherein the longitudinal axis is orthogonal to one or more of the first direction and second direction.

8. The method or apparatus of any of the preceding or subsequent embodiments, wherein the receptacle comprises a cavity; wherein the face of the first movable member is configured to direct the powder to a first location within the cavity; wherein the second movable member compacts the powder to a second location within the cavity.

9. The method or apparatus of any of the preceding or subsequent embodiments, further comprising a third moveable member comprising a reciprocating member; the reciprocating member configured for successively compacting the powder at a third location within the cavity.

10. The method or apparatus of any of the preceding or subsequent embodiments, further comprising: one or more actuators for automatically affecting motion of one or more of the first moveable member, second moveable member, and third moveable member.

11. The method or apparatus of any of the preceding or subsequent embodiments, further comprising: a controller coupled to the one or more actuators; and wherein the controller is configured to control one or more of the timing of actuation of the actuators and force applied by the actuators for selective compaction of the microtablet.

12. An apparatus for manufacturing a microtablet from a pharmaceutical powder, the apparatus comprising: a receptacle comprising a cavity for receiving the powder; a first movable member configured for directing the powder in the receptacle in a first direction and collecting the powder at a first location within the cavity; and a second movable member configured for compacting the powder in the receptacle in a second direction to form a solid microtablet having a compressed mass and shape.

13. The method or apparatus of any of the preceding or subsequent embodiments, wherein the compressed mass is a compact cylindrical mass extending along a longitudinal axis, the apparatus further comprising: a third movable member carried by the support structure for successively compacting the compact cylindrical mass along the longitudinal axis.

14. The method or apparatus of any of the preceding or subsequent embodiments, further comprising a mold having a recess in the form of the microtablet for receiving the compact cylindrical mass under the force of the third movable member.

15. The method or apparatus of any of the preceding or subsequent embodiments, further comprising a cylindrical pin movable from a first position outside of the recess to a second position within the recess for ejecting the microtablet from the recess.

16. The method or apparatus of any of the preceding or subsequent embodiments, wherein the first movable member has a face for engaging the powder so as to direct the powder and the second movable member travels between first and second positions along the face of the first movable member for compacting the powder.

17. The method or apparatus of any of the preceding or subsequent embodiments, wherein the second movable member comprises a reciprocating member configured for successively compacting the powder in the second direction.

18. The method or apparatus of any of the preceding or subsequent embodiments, wherein the second direction is orthogonal to the first direction, and wherein the longitudinal axis is orthogonal to one or more of the first direction and second direction.

19. The method or apparatus of any of the preceding or subsequent embodiments, further comprising: a third moveable member comprising a reciprocating member; the reciprocating member configured for successively compacting the powder at a third location within the cavity.

20. The method or apparatus of any of the preceding or subsequent embodiments, further comprising: one or more actuators for automatically affecting motion of one or more of the first moveable member, second moveable member, and third moveable member.

21. The method or apparatus of any of the preceding or subsequent embodiments, further comprising: a controller coupled to the one or more actuators; and wherein the controller is configured to control one or more of the timing of actuation of the actuators and force applied by the actuators for selective compaction of the microtablet.

22. A method of manufacturing a microtablet from a pharmaceutical powder for ingestion by a human, the method including the steps of: directing the powder to form a collected mass of powder at a first density; and repeatedly compacting the collected mass of powder to incrementally increase the density of the collected mass of powder and form a solid microtablet having a compressed mass at a final density and shape.

23. The method or apparatus of any of the preceding or subsequent embodiments, wherein the compressed mass is cylindrical in shape and extends along a longitudinal axis.

24. The method or apparatus of any of the preceding or subsequent embodiments, wherein the repeatedly compacting includes repeatedly compacting the cylindrical mass along the longitudinal axis.

25. The method or apparatus of any of the preceding or subsequent embodiments, wherein the repeatedly compacting includes repeatedly compacting the cylindrical mass into a cylindrical mold to form the microtablet.

26. The method or apparatus of any of the preceding or subsequent embodiments, wherein the directing the powder comprises compacting the powder in at least one direction to form a compressed mass of the first density.

27. The method or apparatus of any of the preceding or subsequent embodiments, wherein directing the powder comprises compressing the powder in a first direction and compacting the powder is done in a second direction orthogonal to the first direction.

28. The method or apparatus of any of the preceding or subsequent embodiments, wherein the repeatedly compacting includes repeated compacting the compressed mass in an additional direction that is orthogonal to both the first direction and the second direction.

29. The method or apparatus of any of the preceding or subsequent embodiments, wherein directing includes directing the powder with the use of a funnel to form the compressed mass.

30. The method or apparatus of any of the preceding or subsequent embodiments, wherein the compacting includes compacting the powder in at least one direction with the use of at least one movable compacting member.

31. The method or apparatus of any of the preceding or subsequent embodiments, wherein directing the powder includes directing the powder in a first direction with a first movable member and compressing the powder in a second direction with a second movable member to form a compact cylindrical mass of the powder extending along a longitudinal axis.

32. The method or apparatus of any of the preceding or subsequent embodiments, wherein the repeatedly compacting includes repeatedly compacting the compact cylindrical mass along the longitudinal axis with a reciprocating third compacting member.

33. The method or apparatus of any of the preceding or subsequent embodiments, wherein the pharmaceutical powder includes a large drug molecule having at least one of a protein, peptide and antibody.

34. The method or apparatus of any of the preceding or subsequent embodiments, wherein the pharmaceutical powder includes a biological activity, and wherein the biological activity of the pharmaceutical powder in the formed microtablet has at least 70% of the biological activity prior to compression.

35. The method or apparatus of any of the preceding or subsequent embodiments, wherein the biological activity of the pharmaceutical powder in the formed microtablet has at least 90% of the biological activity prior to compression.

36. The method or apparatus of any of the preceding or subsequent embodiments, wherein the biological activity of the pharmaceutical powder in the formed microtablet has at least 95% of the biological activity prior to compression.

37. The method or apparatus of any of the preceding or subsequent embodiments, wherein the formed microtablet has a density in a range of about 1.00 to 1.15 $mg/mm^3$.

38. The method or apparatus of any of the preceding or subsequent embodiments, wherein the formed microtablet has a density in a range of about 1.02 to 1.06 $mg/mm^3$.

39. A method of manufacturing a microtablet from a drug comprising at least one of a protein, peptide and antibody for ingestion by a human, the method including the steps of: compacting the powder in a first direction with a first movable compacting member and compacting the powder in a second direction with a second movable compacting member to form a compact cylindrical mass of the drug extending along a longitudinal axis; and repeatedly compacting the compact cylindrical mass along the longitudinal axis alongside the first movable compacting member and the second movable compacting member with a reciprocating cylindrical member.

40. The method or apparatus of any of the preceding or subsequent embodiments, wherein the repeatedly compacting includes repeatedly compacting the compact cylindrical mass into a cylindrical mold.

41. A method for forming a microscale shaped mass, the method comprising: providing material into a fill area of the device, thereby initiating an automated process comprising: a. pushing the material out of the fill area into a formation area of the device, b. compressing the material in the formation area of the device into the microscale shaped mass having a perimeter conforming to an inner surface of the formation area, and c. ejecting the microscale shaped mass.

42. The method or apparatus of any of the preceding or subsequent embodiments, wherein the automated process further comprises the providing of the material into the fill area.

43. The method or apparatus of any of the preceding or subsequent embodiments, wherein the automated process further comprises a repetitive action comprising: the providing of the material, and the pushing of the material, the repetitive action configured to end when the formation area contains a predetermined amount of material.

44. The method or apparatus of any of the preceding or subsequent embodiments, wherein each repetition of the repetitive action further comprises tamping the material into the formation area after pushing the material into the formation area.

45. The method or apparatus of any of the preceding or subsequent embodiments, wherein the ejecting of the shaped mass comprises extending a formation portion of the device including the formation area away from a remaining portion of the device, pushing the shaped mass from a first edge of the formation portion and collecting the shaped mass from a second edge of the formation portion opposite the first edge.

46. The method or apparatus of any of the preceding or subsequent embodiments, wherein the microscale shaped mass comprises a therapeutic composition.

47. The method or apparatus of any of the preceding or subsequent embodiments, wherein the formation portion is cylindrical.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The foregoing description of various embodiments of the technology of the present disclosure has been presented for purposes of illustration and description. It is not intended to limit the technology of the present disclosure to the precise forms disclosed. Many modifications, variations and refinements will be apparent to practitioners skilled in the art. For example, embodiments of the device can be sized and otherwise adapted for various pediatric and neonatal applications as well as various veterinary applications. They may also be adapted for the urinary tracts of both male and females. Further, those skilled in the art will recognize, or be able to ascertain using no more than routine experimentation, numerous equivalents to the specific devices and methods described herein. Such equivalents are considered to be within the scope of the present technology of the present disclosure and are covered by the appended claims below.

Elements, characteristics, or acts from one embodiment can be readily recombined or substituted with one or more elements, characteristics or acts from other embodiments to form numerous additional embodiments within the scope of the technology of the present disclosure. Moreover, elements that are shown or described as being combined with other elements, can, in various embodiments, exist as stand-alone elements. Hence, the scope of the present technology of the present disclosure is not limited to the specifics of the described embodiments, but is instead limited solely by the appended claims.

What is claimed is:

1. A method of manufacturing a microtablet from a pharmaceutical powder for ingestion by a human, the method including the steps of:

directing the powder in a first direction with a first movable member to form a collected mass of powder at a first density;

compacting the collected mass in a second direction with a second movable member to form a compacted mass of powder; and repeatedly compacting the compacted mass of powder to incrementally increase the density of the compacted mass of powder and form a solid microtablet having a compressed mass at a final density and shape.

2. The method of claim 1, wherein the compressed mass is a cylindrical mass and extends along a longitudinal axis.

3. The method of claim 2, wherein the repeatedly compacting includes repeatedly compacting the cylindrical mass along the longitudinal axis.

4. The method of claim 2, wherein the repeatedly compacting includes repeatedly compacting the cylindrical mass into a cylindrical mold to form the microtablet.

5. The method of claim 1, wherein the second direction is orthogonal to the first direction.

6. The method of claim 5, wherein the repeatedly compacting includes repeated compacting the compacted mass in a third direction that is orthogonal to both the first direction and the second direction.

7. The method of claim 1, wherein directing the powder includes directing the powder with a funnel.

8. The method of claim 1, wherein the repeatedly compacting includes repeatedly compacting the compacted mass with a reciprocating third compacting member.

9. The method of claim 1, wherein the pharmaceutical powder includes a large drug molecule having at least one of a protein, peptide and antibody.

10. The method of claim 1, wherein the pharmaceutical powder includes a biological activity, and wherein the biological activity of the pharmaceutical powder in the formed microtablet has at least 70% of the biological activity prior to compression.

11. The method of claim 1, wherein a biological activity of the pharmaceutical powder in the formed microtablet has at least 90% of the biological activity prior to compression.

12. The method of claim 1, wherein a biological activity of the pharmaceutical powder in the formed microtablet has at least 95% of the biological activity prior to compression.

13. The method of claim 1, wherein the formed microtablet has a density in a range of about 1.00 to 1.15 $mg/mm^3$.

14. The method of claim 1, wherein the formed microtablet has a density in a range of about 1.02 to 1.06 $mg/mm^3$.

15. A method of manufacturing a microtablet from a pharmaceutical powder comprising at least one of a protein, peptide and antibody for ingestion by a human, the method including the steps of:

compacting the powder in a first direction with a first movable compacting member and compacting the powder in a second direction with a second movable compacting member to form a compact cylindrical mass of the powder extending along a longitudinal axis; and repeatedly compacting the compact cylindrical mass along the longitudinal axis alongside the first movable compacting member and the second movable compacting member with a reciprocating cylindrical member.

16. The method of claim 15, wherein the repeatedly compacting includes repeatedly compacting the compact cylindrical mass into a cylindrical mold.

17. A method for forming a microscale shaped mass, the method comprising:

providing material into a fill area of a device, thereby initiating an automated process comprising:

a) pushing the material out of the fill area in a first direction with a first movable member into a formation area of the device;

b) tamping the material into the formation area in a second direction with a second movable member;

c) compressing the material in the formation area of the device into the microscale shaped mass having a perimeter conforming to an inner surface of the formation area; and d) ejecting the microscale shaped mass.

18. The method of claim 17, wherein the automated process further comprises the providing of the material into the fill area.

19. The method of claim 17, wherein the automated process further comprises a repetitive action comprising:

the providing of the material, and the pushing of the material, the repetitive action configured to end when the formation area contains a predetermined amount of the material.

20. The method of claim 17, wherein the ejecting of the microscale shaped mass comprises extending a formation portion of the device including the formation area away from a remaining portion of the device, pushing the microscale shaped mass from a first edge of the formation portion and collecting the microscale shaped mass from a second edge of the formation portion opposite the first edge.

21. The method of claim 17, wherein the microscale shaped mass comprises a therapeutic composition.

22. The method of claim 17, wherein the formation area is cylindrical.

23. The method of claim 15, wherein the second direction is orthogonal to the first direction.

24. The method of claim 23, wherein the repeatedly compacting includes repeatedly compacting the compact cylindrical mass in a third direction orthogonal to both the first direction and the second direction.

25. The method of claim 17, wherein the second direction is orthogonal to the first direction.

26. The method of claim 25, wherein the compressing includes compressing the material in a third direction orthogonal to both the first direction and the second direction.

* * * * *